(12) United States Patent
Ueha et al.

(10) Patent No.: US 8,808,606 B2
(45) Date of Patent: Aug. 19, 2014

(54) MOLDING APPARATUS AND METHOD

(75) Inventors: Ayato Ueha, Tochigi (JP); Susumu Horinaka, Tochigi (JP); Haruka Ito, Tochigi (JP); Yasuki Okanemasa, Tochigi (JP)

(73) Assignee: Honda Motor Co., Ltd., Tokyo (JP)

(*) Notice: Subject to any disclaimer, the term of this patent is extended or adjusted under 35 U.S.C. 154(b) by 67 days.

(21) Appl. No.: 13/234,466

(22) Filed: Sep. 16, 2011

(65) Prior Publication Data
US 2012/0292826 A1 Nov. 22, 2012

(30) Foreign Application Priority Data

Sep. 17, 2010 (JP) ................. 2010-209988
Sep. 17, 2010 (JP) ................. 2010-210069

(51) Int. Cl.
| | | |
|---|---|---|
| *B29C 45/73* | (2006.01) | |
| *B22D 17/22* | (2006.01) | |
| *B29C 35/08* | (2006.01) | |
| *B29C 45/42* | (2006.01) | |

(52) U.S. Cl.
CPC ......... *B29C 45/73* (2013.01); *B29C 2035/0811* (2013.01); *B29C 2035/0816* (2013.01); *B29C 45/42* (2013.01); *B22D 17/2218* (2013.01)
USPC .......................................... 264/403; 264/402

(58) Field of Classification Search
CPC ........ B29C 45/73; B29C 45/42; B29C 33/06; B29C 33/08
USPC ....................... 264/403, 478, 328.1
See application file for complete search history.

(56) References Cited

U.S. PATENT DOCUMENTS

| | | | | | |
|---|---|---|---|---|---|
| 4,340,551 | A | * | 7/1982 | Wada et al. | 264/403 |
| 4,439,492 | A | * | 3/1984 | Wada et al. | 428/409 |
| 5,062,786 | A | * | 11/1991 | Arai | 425/174 |
| 5,851,474 | A | * | 12/1998 | Allan et al. | 264/403 |
| 6,310,333 | B2 | * | 10/2001 | Shibata et al. | 219/635 |
| 8,052,415 | B2 | * | 11/2011 | Chen et al. | 425/547 |
| 8,272,864 | B2 | * | 9/2012 | Lin | 425/547 |
| 2002/0015746 | A1 | * | 2/2002 | Mitamura et al. | 425/50 |
| 2005/0016995 | A1 | * | 1/2005 | Mitamura et al. | 219/635 |
| 2005/0186302 | A1 | * | 8/2005 | Sohn et al. | 425/392 |
| 2008/0042322 | A1 | * | 2/2008 | Choi et al. | 264/328.1 |

(Continued)

FOREIGN PATENT DOCUMENTS

| | | | |
|---|---|---|---|
| JP | 1991-0225 | * | 6/1989 |
| JP | 02310013 | * | 12/1990 |
| JP | H03-18954 U | | 2/1991 |
| JP | 1996-0409 | * | 9/1994 |

(Continued)

*Primary Examiner* — Galen Hauth
(74) *Attorney, Agent, or Firm* — Rankin, Hill & Clark LLP

(57) ABSTRACT

In a molding machine, an electrical current is caused to flow to a coil by a high-frequency power supply, and a magnetic field is generated, whereupon lines of magnetic force are generated so as to substantially conform to cavity faces of the stationary mold and the moveable mold. The magnetic field strength is constant with respect to position in the lengthwise direction of the coil, and eddy currents are generated uniformly with respect to the cavity faces. Because the molds have electrical resistance, Joule heat is generated by the eddy currents and electrical resistance, and the cavity faces are heated. When a material in a molten state is injected into the cavities of the heated molds, flowability of the material is promoted, and therefore the quality of the molded article is improved.

3 Claims, 15 Drawing Sheets

(56) References Cited

U.S. PATENT DOCUMENTS

2009/0250666 A1* 10/2009 Saga ............................. 252/512
2010/0065552 A1* 3/2010 Matsen et al. ................ 219/671
2011/0140310 A1* 6/2011 Lin .............................. 264/403
2013/0093120 A1* 4/2013 Ito et al. ....................... 264/403

FOREIGN PATENT DOCUMENTS

| JP | 08-090623 | | 4/1996 |
| JP | 2001-300999 | * | 10/2001 |
| JP | 2005-219280 | * | 8/2005 |
| JP | 2007-535786 | | 12/2007 |

* cited by examiner

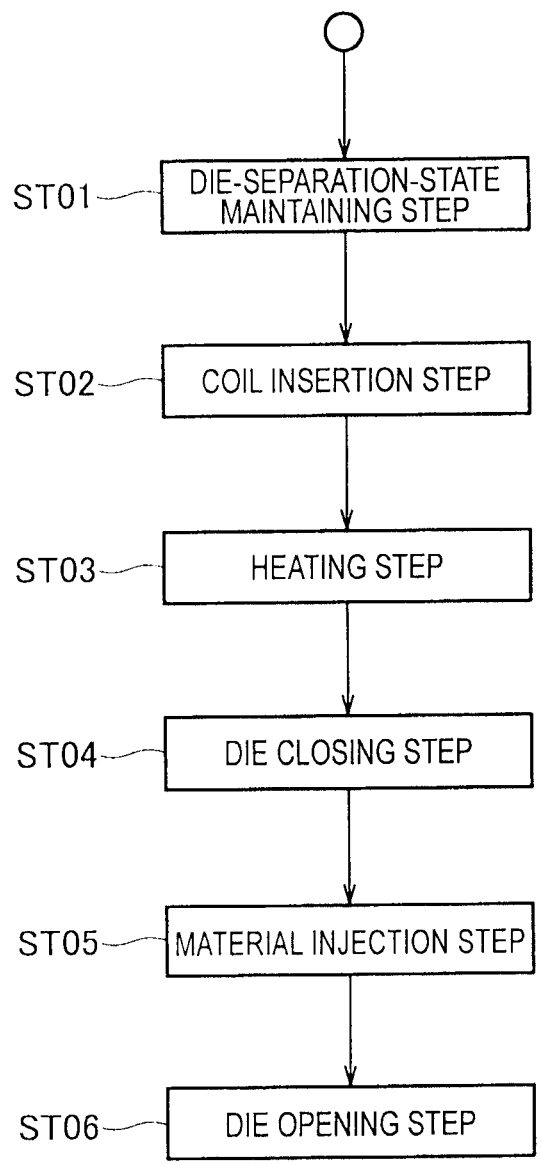

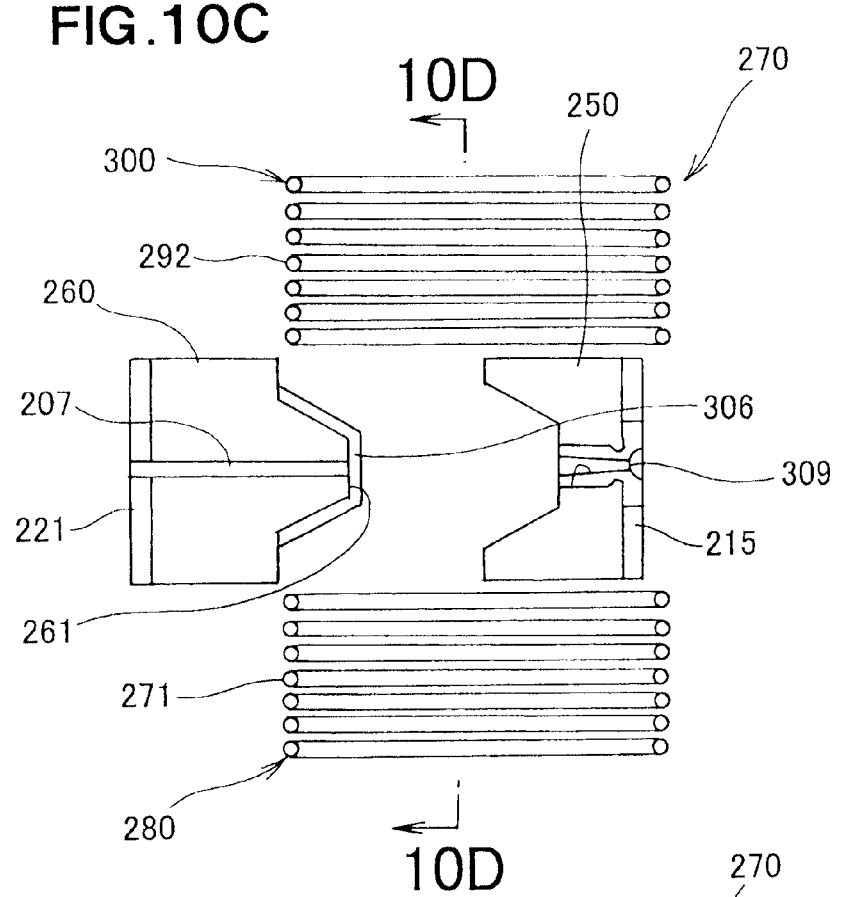
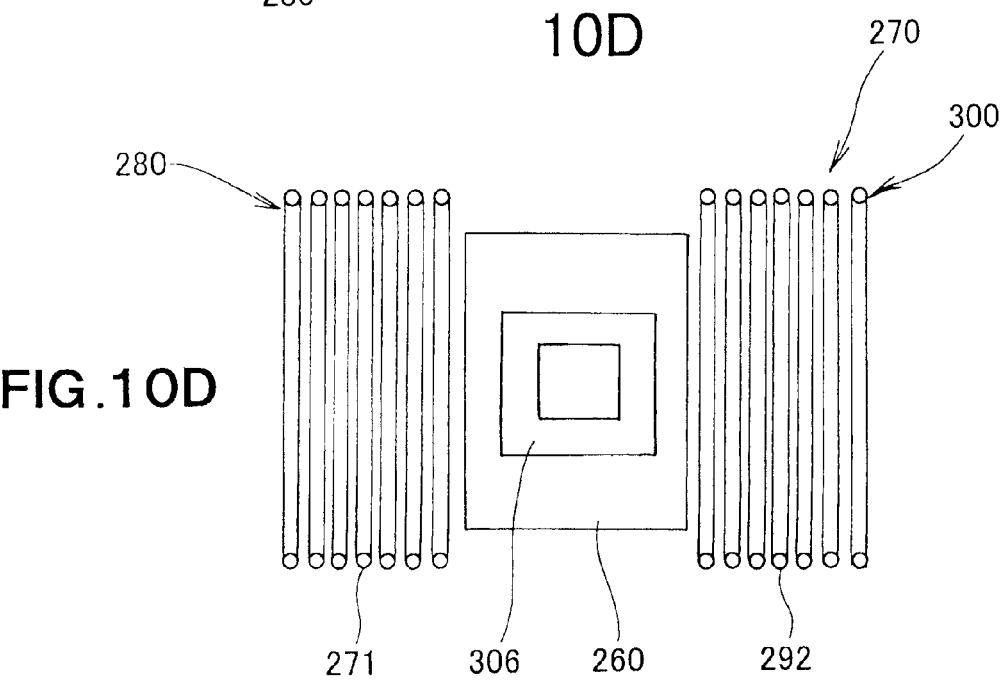

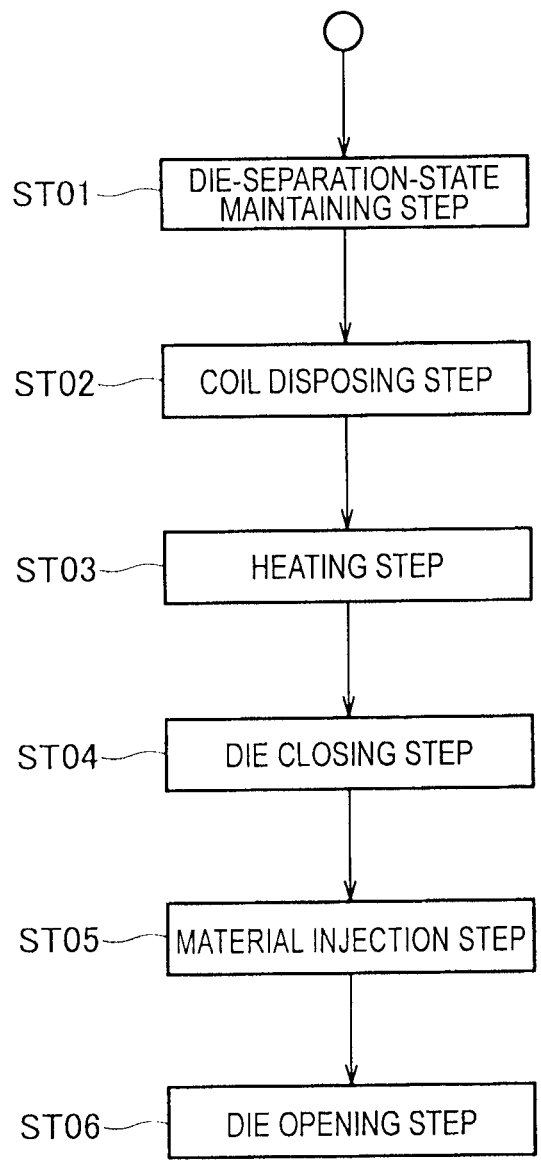

MOLDING APPARATUS AND METHOD

FIELD OF THE INVENTION

The present invention relates to a molding technique for obtaining a molded article using a pair of molds heated by heating means.

BACKGROUND OF THE INVENTION

An injection molding technique is a technique whereby a resin-molded article can be obtained by injecting a molten resin into a cavity of a mold and then cooling the molten resin to a solid. If the flowability of the molten resin declines at the time of injection of the molten resin, short fill of the molten resin occurs inside the cavity. Short fill of the molten resin can result in degraded quality of the resin molded article. Accordingly, prior to injection of the molten resin into the mold cavity, it is necessary to raise the temperature of the cavity surfaces in order to increase the flowability of the molten resin inside the cavity.

Heating means disclosed, for example, in Japanese Patent Application Laid-Open Publication No. H08-090623 (JP-A H08-090623 A) are known means for raising the temperature of cavity surfaces in the prior art. FIG. 12 hereof illustrates a basic arrangement of the heating means disclosed in JP-A H08-90623 A.

As shown in FIG. 12, the prior art heating means 400 comprises: an induction heating device composed of an upper-side high-frequency induction coil 401 of a conductor wire of spiral form wound clockwise from the center to the outside; a lower-side high-frequency induction coil 402 of a conductor wire of spiral form wound counterclockwise from the center to the outside and connected to the center of the upper-side high-frequency induction coil 401; and a high-frequency power supply 405 connected to the upper-side high-frequency induction coil 401 via a lead wire 403, and connected to the lower-side high-frequency induction coil 402 via a lead wire 404.

FIG. 13 hereof illustrates a method for using the afore-described high-frequency induction coils. A moving mold 407 is separated from a stationary mold 406, and the upper-side high-frequency induction coil 401 and the lower-side high-frequency induction coil 402 are inserted between the cavity surface 408 of the stationary mold 406 and the cavity surface 409 of the moving mold 407. Prior to injecting molten resin into the cavity of the mold, the cavity surfaces 408, 409 are heated with the heating means 400.

FIGS. 14A and 14B illustrate an operation of the above-described high-frequency induction coils. In FIG. 14A, the coils are illustrated using only the high-frequency induction coil 401. An electrical current is caused to flow through the high-frequency induction coil 401 by the high-frequency power supply 405 (FIG. 13), generating a magnetic field. Once the magnetic field is generated, lines of magnetic force are generated in the high-frequency induction coil 401 as indicated by the arrows (1).

FIG. 14B depicts a relationship of position in the diametrical direction of the high-frequency induction coil 401 and an intensity of the magnetic field. The intensity of the magnetic field reaches maximum in proximity to a second intermediate part 413 and a third intermediate part 414, and reaches minimum in a center space part 417. In other words, the intensity of the magnetic field generated by the high-frequency induction coil 401 is not constant with respect to position in the direction of coil diameter.

When the cavity surfaces 408, 409 are heated by the heating means 400 depicted in FIG. 13, at the cavity surfaces that correspond to the second intermediate part 413 and the third intermediate part 414 of the high-frequency induction coil 401, the amount of generated eddy current is greater due to high intensity of the magnetic field. On the other hand, at the cavity surfaces that correspond to an innermost part 411, an outermost part 416, and the center space part 417 of the high-frequency induction coil 401, the amount of generated eddy current is smaller due to low intensity of the magnetic field.

Where the amount of generated eddy current differs, a differential arises in Joule heat. If molten resin is injected and molded in a cavity having a heat differential among regions, flaws such as warpage, deformation, and the like, are generated in the resin molded article. Accordingly, there is a need for a molding technique by which molding quality can be improved.

In die casting or injection molding, a material is injected in a molten state into the cavity of a mold, and a molded article is obtained by cooling the material to a solid from the molten state. If the flowability of the material declines at the time that the material is injected in a molten state, the material will solidify before reaching the corners of the cavity. This gives rise to short fill of the material, leading to poorer quality of the molded article, necessitating measures to promote flowability of the material.

In order to promote flowability of the material, molding apparatuses in which measures are implemented for this purpose are known, for example, in Japanese Domestic Republication 2007-535786. FIG. 15 depicts a basic configuration of this prior art molding apparatus.

In FIG. 15, the molding apparatus 500 is composed of an upper die 501; a lower die 502; a high-frequency induction coil 505 disposed in proximity to an outer wall face 503 of the upper die 501 and an outer wall face 504 of the lower die 502 so as to encircle the outer perimeter of the upper die 501 and the lower die 502; and a high-frequency power supply connected to the high-frequency induction coil 505.

FIG. 16 depicts the action of the molding apparatus 500 depicted in FIG. 15. According to FIG. 16, in a state with the upper die 501 separated from the lower die 502, a current is caused to flow into the high-frequency induction coil 505 by the high-frequency power supply, and a magnetic field is generated in the high-frequency induction coil 505. In one moment of the time a magnetic field is generated, an eddy current is generated in the upper die 501 in the manner of the arrow (1), while an eddy current is generated in the lower die 502 in the manner of the arrow (2). Because the upper die 501 and the lower die 502 have electrical resistance, Joule heat is generated by the eddy currents and electrical resistance, and the upper die 501 and the lower die 502 are heated by this heat. If the upper die 501 and the lower die 502 are heated before material is injected in a molten state into the cavity, the flowability of the material is increased, and molding defects can be eliminated.

The high-frequency induction coil 505 is wound in proximity to the outer wall face 503 of the upper die 501 and the outer wall face 504 of the lower die 502. It is accordingly necessary to take measures so that the high-frequency induction coil 505 does not impede the movement of the upper die 501 when the upper die 501 is lifted further in order to open the die, making the system cumbersome to use. Accordingly, there is a desire for a molding technique whereby operability can be further improved.

SUMMARY OF THE INVENTION

It is an object of the present invention to provide a molding technique whereby molding quality can be improved.

According a first aspect of the present invention, there is provided a molding apparatus which comprises: heating means having a high-frequency induction coil and a high-frequency power supply connected to the high-frequency induction coil; and a pair of molds adapted to be heated by the heating means, wherein the high-frequency induction coil is disposed between respective cavity faces of the molds separated from each other, in a substantially parallel direction with respect to the cavity faces of the molds, and is wound in a helical fashion in the substantially parallel direction.

In this arrangement, the high-frequency induction coil is disposed between the cavity faces of the separated pair of molds in a substantially parallel direction with respect to the cavity faces of the molds, and is wound in a helical fashion in the substantially parallel direction. In other words, the high-frequency induction coil is disposed substantially parallel with respect to the cavity faces. When an electrical current is caused to flow to the high-frequency induction coil by the high-frequency power supply to generate a magnetic field, lines of magnetic force are generated so as to substantially conform to the cavity faces, and therefore eddy currents are generated uniformly with respect to the cavity faces. Because the molds have electrical resistance, Joule heat is generated by the eddy currents and electrical resistance, and the cavity faces can be heated by this heat. When a material in the molten state is injected into the cavity of the heated molds, flowability of the material is promoted, and therefore the quality of the molded article can be improved. Consequently, a molding apparatus whereby molding quality can be improved can be provided.

Preferably, the high-frequency induction coil comprises a coil assembly of plural coils disposed in an array. In a case where the high-frequency induction coil is composed of a single coil, while an elongated cavity face of a small surface area can be heated, heating will take considerable time in the case of a cavity face with a large surface area. In this regard, because the high-frequency induction coil of the present invention has a plurality of coils disposed in an array, a cavity face with a large surface area can be heated in a short time.

According to a second aspect of the present invention, there is provided a molding method implemented using a molding apparatus which comprises heating means having a high-frequency induction coil and a high-frequency power supply, and a die comprised of a stationary mold and a moveable mold, the method comprising the steps of: maintaining the moveable mold in a state separated from the stationary mold by a predetermined distance; inserting the high-frequency induction coil, which is wound in a helical fashion in a direction substantially parallel with respect to a cavity face of the stationary mold and a cavity face of the moveable mold, in the substantially parallel direction between the cavity face of the stationary mold and the cavity face of the moveable mold; heating the stationary mold and the moveable mold by Joule heat obtained by causing an electrical current to flow from the high-frequency power supply to the high-frequency induction coil to thereby generate a magnetic field and an eddy current in the stationary mold and the moveable mold; closing the die by bringing together the moveable mold and the stationary mold when the stationary mold and the moveable mold are heated to a predetermined temperature; injecting a molten-state material into a cavity of the closed stationary mold and moveable mold; and opening the die by separating the moveable mold from the stationary mold in order to retrieve a molded article having cooled to a solid in the cavity.

In the coil insertion step according to the second aspect of the present invention, the high-frequency induction coil wound in a helical fashion in a substantially parallel direction with respect to the cavity face of the stationary mold and the cavity face of the moveable mold is inserted in the substantially parallel direction between the cavity face of the stationary mold and the cavity face of the moveable mold. In other words, the high-frequency induction coil is disposed substantially parallel with respect to the cavity faces.

When an electrical current is caused to flow to the high-frequency induction coil by the high-frequency power supply to generate a magnetic field, lines of magnetic force are generated so as to substantially conform to the cavity faces, and therefore eddy currents are generated uniformly with respect to the cavity faces. Because the molds have electrical resistance, Joule heat is generated by the eddy currents and electrical resistance, and the cavity faces can be heated by this heat. When a material in the molten state is injected into the heated mold cavity, flowability of the material is promoted, and therefore the quality of the molded article can be improved. Consequently, a molding method whereby molding quality can be improved can be provided.

Desirably, the high-frequency induction coil comprises a plurality of coils disposed in an array. Consequently, in a case where the high-frequency induction coil is composed of a single coil, an elongated cavity face of a small surface area can be heated, whereas heating will take considerable time in the case of a cavity face with a large surface area. In this regard, because the high-frequency induction coil of the present invention has a plurality of coils disposed in an array, a cavity face with a large surface area can be heated in a short time.

According to a third aspect of the present invention, there is provided a molding apparatus for obtaining a molded article using a pair of molds heated by heating means, wherein the heating means comprises: a pair of high-frequency induction coils respectively furnished in proximity to first outside faces of the pair of molds and to other outside faces of the pair of molds, which faces are parallel to the opening/closing direction of the pair of molds, ring sections wound a plurality of times in an annular configuration facing one another; and a high-frequency power supply connected to the pair of high-frequency induction coils, the high-frequency power supply adapted for imparting an electrical current to the high-frequency induction coils.

In other words, the pair of high-frequency induction coils are disposed parallel to the opening/closing direction of the pair of molds, and accordingly there is no concern that the moveable mold will strike the high-frequency induction coils during die opening. Consequently, in a molding apparatus for heating molds by heating means, a device whereby operability can be further improved can be provided.

According to a fourth aspect of the present invention, there is provided a molding method implemented using a molding apparatus which comprises heating means having a pair of high-frequency induction coils and a high-frequency power supply, and a die comprised of a stationary mold and a moveable mold, the method comprising the steps of: maintaining the moveable mold in a state separated a predetermined distanced from the stationary mold; disposing the coils such that the pair of high-frequency induction coils are brought into proximity with a first outside face of the stationary mold and a first outside face of the moveable mold, and with another outside face of the stationary mold and another outside face of the moveable mold, which faces are parallel to the moveable direction of the moveable mold, and the pair of high-frequency induction coils are disposed so that ring sections wound a plurality of times in an annular configuration within the high-frequency induction coils face one another; heating the stationary mold and the moveable mold by Joule heat obtained by causing an electrical current to flow from the high-frequency power supply to the pair of high-frequency induction coils to thereby generate a magnetic field and an Eddy current in the stationary mold and the moveable mold; closing the die by bringing together the moveable mold and the stationary mold when the stationary mold and the moveable mold are heated to a predetermined temperature; injecting a molten-state material into a cavity of the closed stationary mold and the moveable mold; and opening the die by separating the moveable mold from the stationary mold in order to retrieve the molded article cooled to a solid in the cavity.

In the coil-disposing step, the pair of high-frequency induction coils are brought into proximity with a first outside face of the stationary mold and a first outside face of the moveable mold, and with another outside face of the stationary mold and another outside face of the moveable mold, which faces are parallel to the moveable direction of the moveable mold, and the pair of high-frequency induction coils are disposed with ring sections wound a plurality of times in an annular configuration within the high-frequency induction coils facing one another.

In other words, the pair of high-frequency induction coils are disposed parallel to the mold opening/closing direction, and accordingly there is no concern that the moveable mold will strike the high-frequency induction coils during die opening. Consequently, in a molding method for heating molds by heating means, a method whereby operability can be further improved can be provided.

BRIEF DESCRIPTION OF THE DRAWINGS

Certain preferred embodiments of the present invention are described in detail below, by way of example only, with reference to the accompanying drawings, in which:

FIG. 4A and FIG. 4B are views illustrating a manner of insertion of a high-frequency induction coil between a stationary mold and a moveable mold;

FIG. 6 is a flow diagram illustrating a molding method according to the first embodiment;

FIG. 10A to FIG. 10D are views illustrating states leading up to heating of a stationary mold and a moveable mold and die opening, FIG. 10D being a sectional view along line 10D-10D of FIG. 10C;

FIG. 11 is a flow diagram illustrating a molding method according to the second embodiment;

DETAILED DESCRIPTION OF THE PREFERRED EMBODIMENTS

First Embodiment

Figure 1:
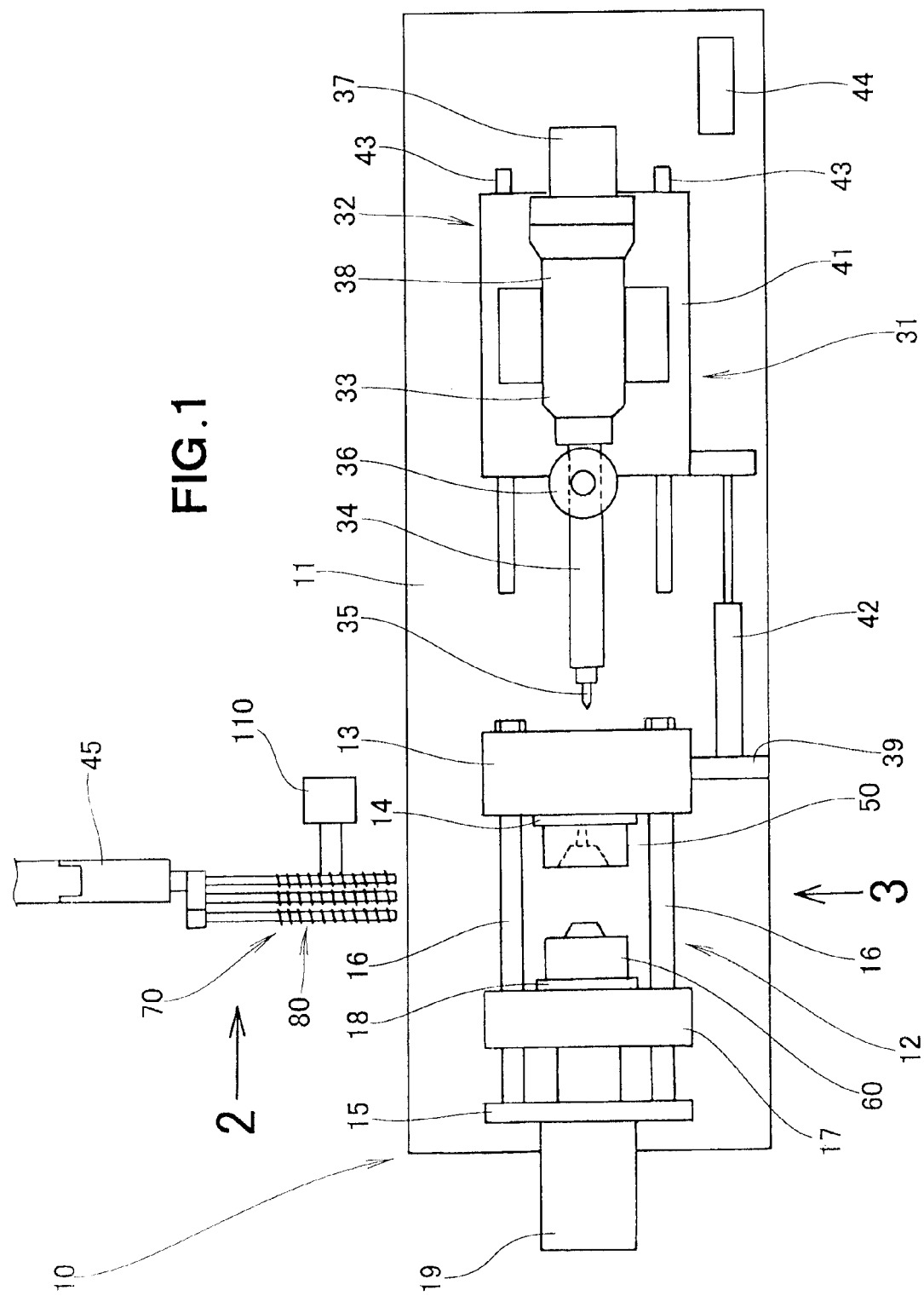
FIG. 1 is top plan view schematically illustrating a molding apparatus according to a first embodiment of the present invention.

As depicted in FIG. 1, an injection molding machine 10 according to a first embodiment is composed of a die closure device 12 disposed in the front part of a bed 11, and an injection device 31 disposed in the back part of the bed 11, so as to face toward this die closure device 12. A pair of molds provided to the die closure device 12 is composed of a stationary mold 50 and a moveable mold 60.

The die closure device 12 is provided with a stationary platen 13 attached to the center part of the bed 11; the stationary mold 50 which is attached to the front end of this stationary platen 13 via a stationary-side attachment plate 14; a support member 15 attached to the front end of the bed 11; four tie bars 16 attached to the stationary platen 13 and to the support member 15; a moveable platen 17 attached in horizontal sliding fashion to the tie bars 16; the moveable mold 60 which is attached to the back end of this moveable platen 17 via a moveable-side attachment plate 18; and a die closure cylinder 19 attached to the support member 15, for moving the moveable platen 17 and the moveable mold 60 in the horizontal direction.

The injection device 31 is composed of an injection cylinder 33 furnished on a slide mechanism 32 which is attached to the back part of the bed 11; a heated cylinder 34 attached to the front end of this injection cylinder 33 and having an internal screw; a nozzle 35 attached to the front end of this heated cylinder 34 and contacting a material injection port 56 (see FIG. 3) of the stationary mold 50; a hopper 36 attached onto the back end of the heated cylinder 34, the hopper adapted for accommodating a resin material supplied into the heated cylinder 34; a screw drive motor 37 attached to the back end of the injection cylinder 33, the screw drive motor adapted for causing the screw to rotate; a screw movement mechanism 38 disposed in the back part of the injection cylinder 33, the screw movement mechanism adapted for causing the screw to move in the horizontal direction; and an injection device movement cylinder 42 that links a support member 39 attached to the stationary platen 13 to a slider 41 of the slide mechanism 32.

Through a pulling operation of the injection device movement cylinder 42, the slider 41 moves along rails 43, 43 toward the die closure device 12, and therefore the nozzle 35 can be brought into contact with the material injection port of the stationary mold 50.

A control device 44 controls the respective operations of the die closure cylinder 19, the screw drive motor 37, the screw movement mechanism 38, and the injection device movement cylinder 42.

Furthermore, heating means 70 is attached to the distal end of a robot arm 45, and this heating means 70 is disposed facing into a space between the stationary mold 50 and the moveable mold 60. The construction of the heating means 70 is illustrated in FIG. 2.

Figure 2:
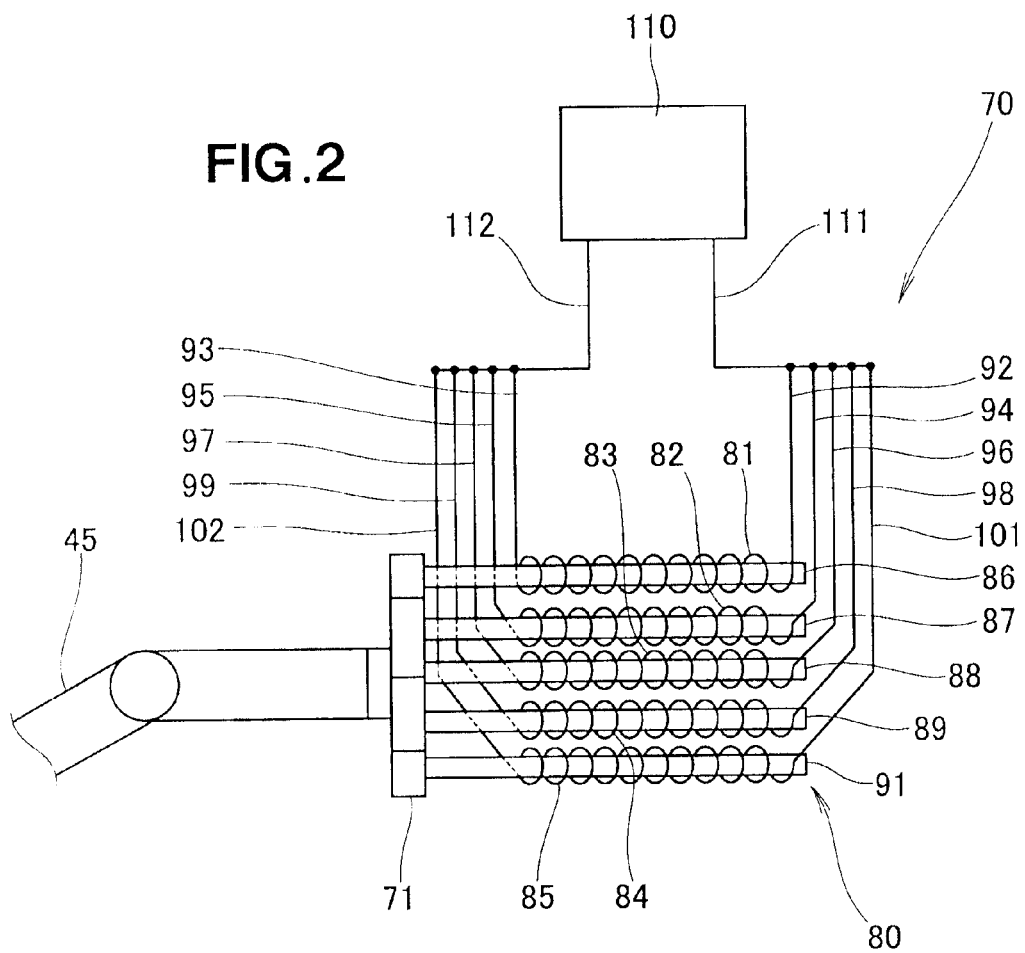
FIG. 2 is a view as seen in the direction of arrow 2 of FIG. 1.

As depicted in FIG. 2, the heating means 70 is comprised of a high-frequency induction coil 80 attached to a coil support member 71, which is furnished to the distal end of the robot arm 45; and a high-frequency power supply 110 connected to this high-frequency induction coil 80. In other words, the heating means 70 is an induction heating device.

The high-frequency induction coil 80 is a coil assembly of five coils disposed in an array. The five coils, lined up from top to bottom, are a first coil 81, a second coil 82, a third coil 83, a fourth coil 84, and a fifth coil 85. The first coil 81 is wound in a helical fashion in a substantially parallel direction to the cavity faces (discussed later) of the stationary mold 50 (FIG. 1) and the moveable mold 60 (FIG. 1), onto a first iron core 86 which is attached to the coil support member 71.

Likewise, the second coil 82 is wound in a helical fashion in a substantially parallel direction to the mold cavity faces, onto a second iron core 87. The third coil 83 is wound onto a third iron core 88 in a helical fashion in a substantially parallel direction to the mold cavity faces. The fourth coil 84 is wound onto a fourth iron core 89 in a helical fashion in a substantially parallel direction to the mold cavity faces. The fifth coil 85 is wound onto a fifth iron core in a helical fashion in a substantially parallel direction to the mold cavity faces, 91. Because the coils 81, 82, 83, 84, 85 are wound onto the respective iron cores, a stronger magnetic field can be generated than with a single coil.

A distal end 92 and a back end 93 of the first coil 81, a distal end 94 and a back end 95 of the second coil 82, a distal end 96 and a back end 97 of the third coil 83, a distal end 98 and a back end 99 of the fourth coil 84, and a distal end 101 and a back end 102 of the fifth coil 85 are all connected to the high-frequency power supply 110.

In a state of the high-frequency induction coil 80 being inserted between the cavity face of the stationary mold 50 (FIG. 1) and the cavity face of the moveable mold 60 (FIG. 1), an electrical current is caused to flow by the high-frequency power supply 110 to the first coil 81, the second coil 82, the third coil 83, the fourth coil 84, and the fifth coil 85 of the high-frequency induction coil 80. When the electrical current flows to the respective coils 81, 82, 83, 84, 85, a magnetic field is generated in each of the coils. Through generation of the magnetic fields, lines of magnetic force are generated, generating eddy currents in the stationary mold and the moveable mold. Because the molds have electrical resistance, Joule heat is generated by the eddy currents and electrical resistance, and the cavity faces can be heated by this heat.

The high-frequency induction coil 80 is a coil assembly of five coils 81, 82, 83, 84, 85 disposed in an array. For example, where a high-frequency induction coil is composed of a single coil, while an elongated cavity face of a small surface area can be heated, heating will take considerable time for a cavity face with a large surface area. In this regard, because the high-frequency induction coil 80 of the present invention has five coils 81, 82, 83, 84, 85 disposed in an array, a cavity face with a large surface area can be heated in a short time.

While the present embodiment has depicted an example in which the high-frequency induction coil 80 is composed of five coils, the quantity of coils may be determined as otherwise desired, and may be four or fewer, or five or more. It is permissible to modify the coil length according to the size of the molds. Next, the construction of the high-frequency induction coil 80 is described based on FIG. 3.

Figure 3:
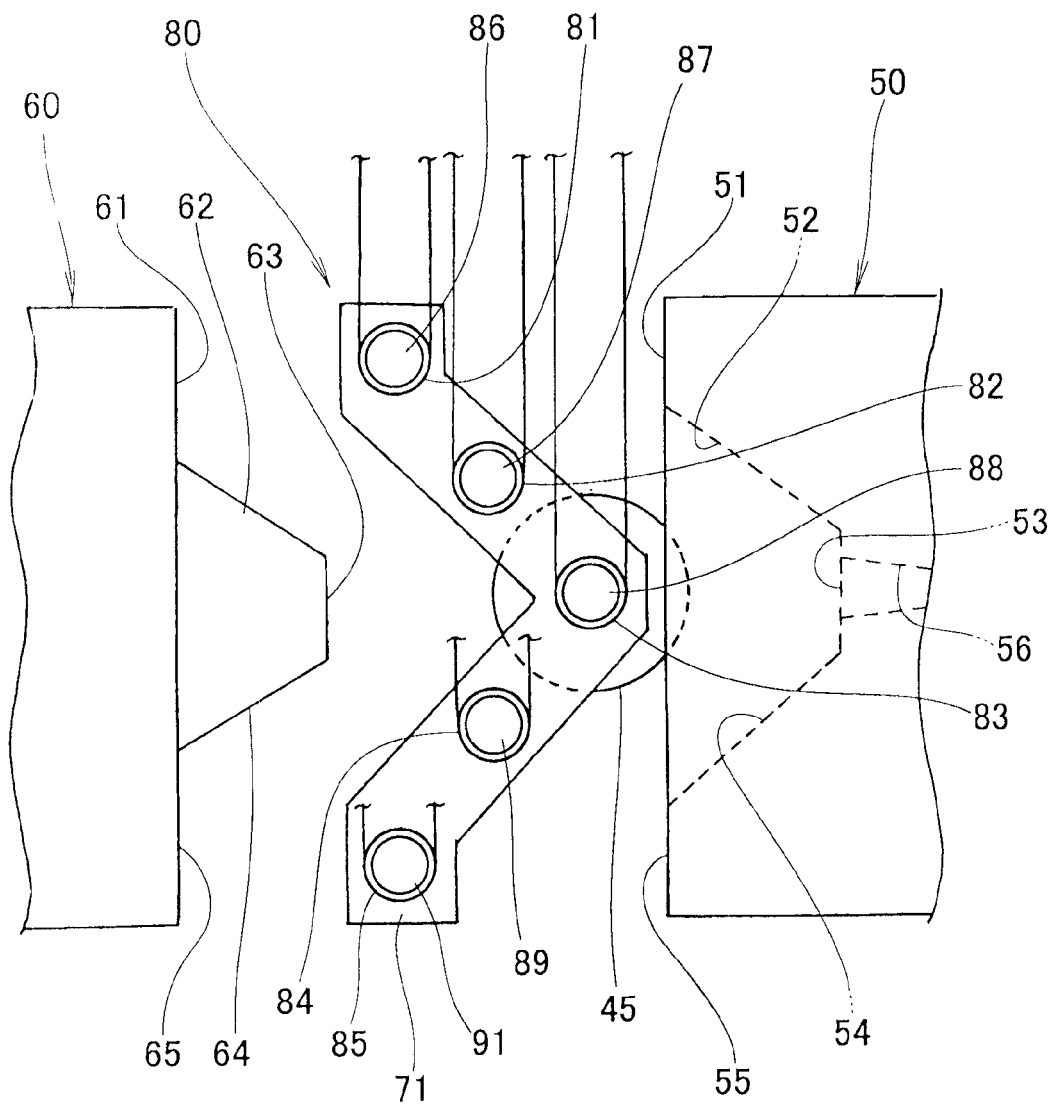
FIG. 3 is a view as seen in the direction of arrow 3 of FIG. 1.

As depicted in FIG. 3, in the high-frequency induction coil 80, the first coil 81 is disposed substantially parallel to an upper-side mating face 51 of the stationary mold 50 and an upper-side mating face 61 of the moveable mold 60.

The second coil 82 is disposed substantially parallel to an upper-side cavity face 52 of the stationary mold 50 and an upper-side cavity face 62 of the moveable mold 60. The third coil 83 is disposed substantially parallel to an intermediate cavity face 53 of the stationary mold 50 and an intermediate cavity face 63 of the moveable mold 60. The fourth coil 84 is disposed substantially parallel to a lower-side cavity face 54 of the stationary mold 50 and a lower-side cavity face 64 of the moveable mold 60. The fifth coil 85 is disposed substantially parallel to a lower-side mating face 55 of the stationary mold 50 and a lower-side mating face 65 of the moveable mold 60.

The action of the injection molding machine 10 discussed above is discussed next.

Figure 4A:
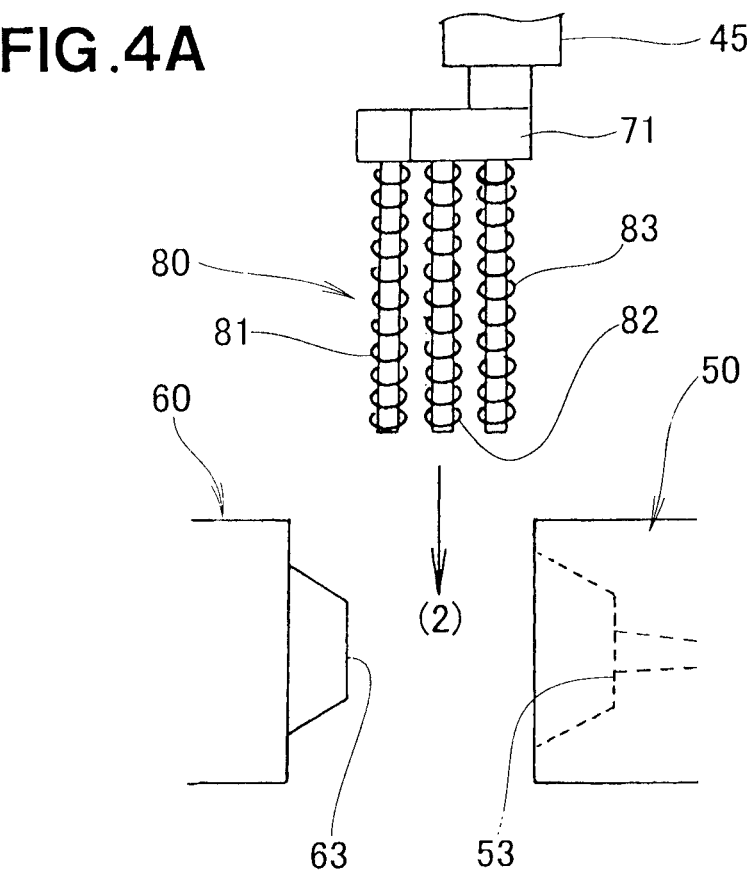
Figure 4A:
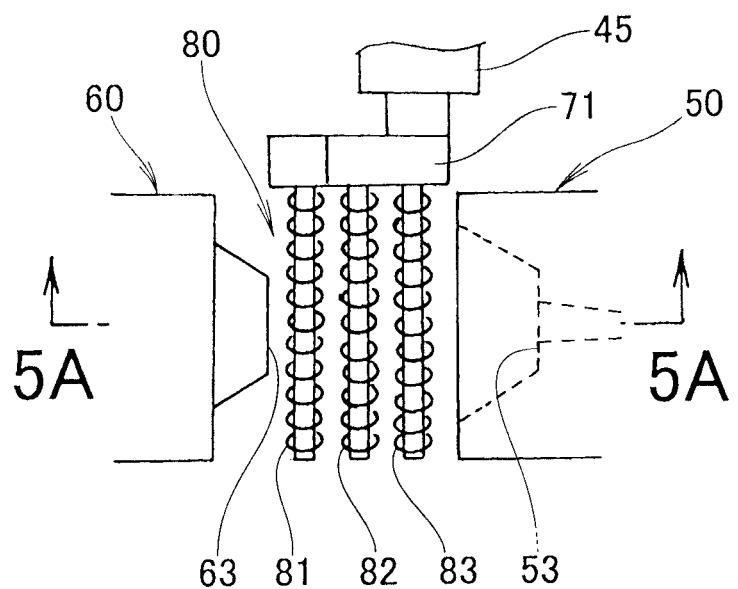

As depicted in FIG. 4A, the high-frequency induction coil 80 faces a space between the stationary mold 50 and the moveable mold 60. The high-frequency induction coil 80 is moved as shown by an arrow (2) by the robot arm 45.

As depicted in FIG. 4B, the high-frequency induction coil 80 is positioned in the space between the stationary mold 50 and the moveable mold 60. Next, heating of the stationary mold 50 and the moveable mold 60 is described with FIG. 5.

Figure 5A:
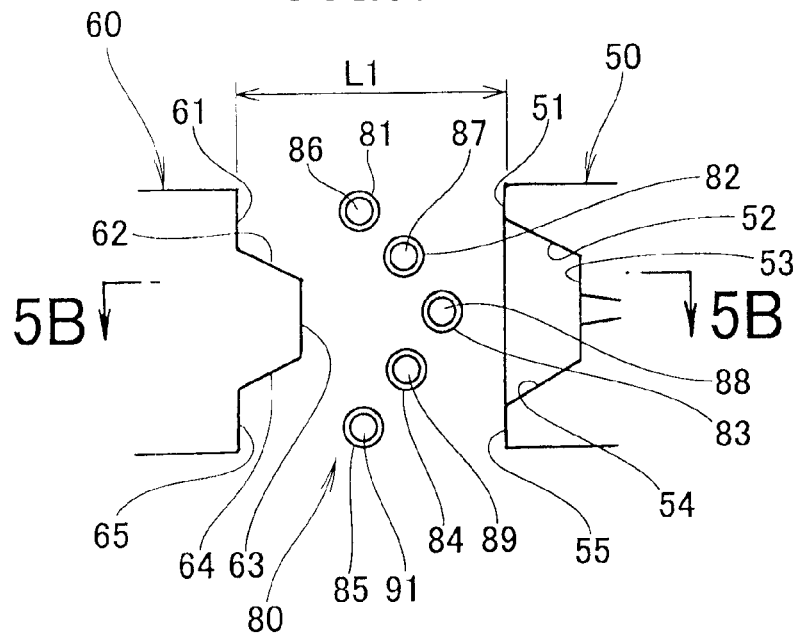
FIG. 5A, FIG. 5B, and FIG. 5C are views illustrating states leading up to heating of a cavity face of the moveable mold, FIG. 5B being a sectional view taken along line 5B-5B of FIG. 5A.

As depicted in FIG. 5A, the first coil 81 is disposed substantially parallel to the upper-side mating faces 51, 61, between the separated stationary mold 50 and moveable mold 60. The second coil 82 is disposed substantially parallel to the upper-side cavity faces 52, 62, between the separated stationary mold 50 and moveable mold 60. The third coil 83 is disposed substantially parallel to the intermediate cavity faces 53, 63, between the separated stationary mold 50 and moveable mold 60. The fourth coil 84 is disposed substantially parallel to the lower-side cavity faces 54, 64, between the separated stationary mold 50 and moveable mold 60. The fifth coil 85 is disposed substantially parallel to the lower-side mating faces 55, 65, between the separated stationary mold 50 and moveable mold 60.

Figure 5B:
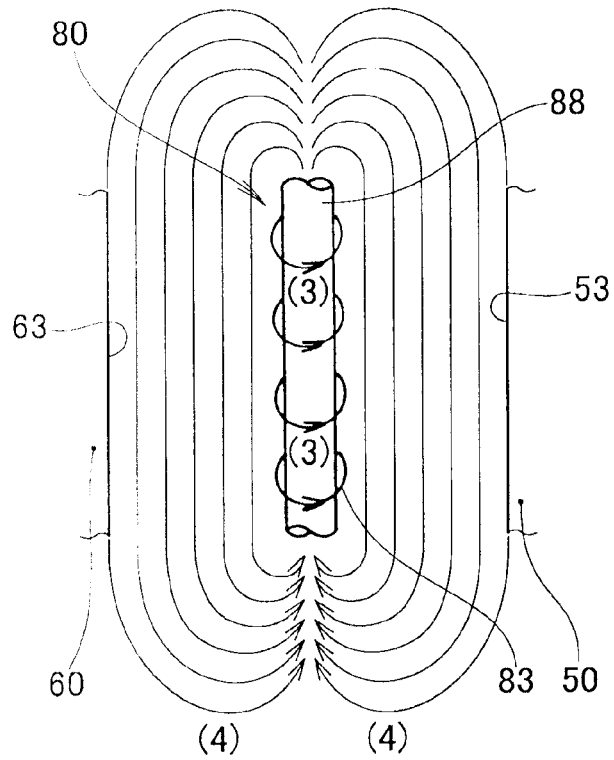

As depicted in FIG. 5B, a magnetic field is generated when an electrical current is caused to flow by the high-frequency power supply 110 (FIG. 2) to the third coil 83 of the high-frequency induction coil 80 as shown by arrows (3). Through generation of this magnetic field, lines of magnetic force are generated so as to substantially conform to the intermediate cavity face 53 of the stationary mold 50 and the intermediate cavity face 63 of the moveable mold 60, as shown by arrows (4).

Figure 5C:
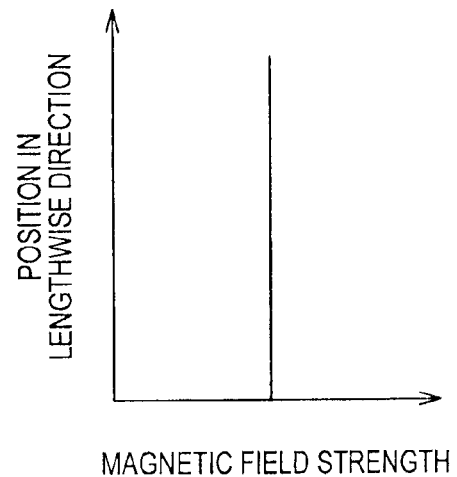

FIG. 5C depicts a relationship of magnetic field strength and position in the lengthwise direction of the third coil 83. The magnetic field strength is constant with respect to the position in the coil lengthwise direction.

In FIG. 5B, the third coil 83 of the high-frequency induction coil 80 is disposed between the separated stationary mold 50 and moveable mold 60, in a substantially parallel direction with respect to the intermediate cavity face 53 of the stationary mold 50 and the intermediate cavity face 63 of the moveable mold 60, and is wound in a helical fashion in the substantially parallel direction. In other words, the third coil 83 of the high-frequency induction coil 80 is disposed substantially parallel to the cavity faces 53, 63.

An electrical current is caused to flow to the third coil 83 of the high-frequency induction coil 80 by the high-frequency power supply, and a magnetic field is generated. Through generation of the magnetic field, lines of magnetic force are generated so as to substantially conform to the cavity faces 53, 63, and therefore the magnetic field strength is constant with respect to the coil lengthwise direction. As long as the magnetic field strength is constant, eddy currents can be generated uniformly at the cavity faces 53, 63.

Because the molds have electrical resistance, Joule heat is generated by the eddy currents and electrical resistance, and the cavity faces can be heated by this heat. When a material in the molten state is injected into the heated mold cavity, flowability of the material is promoted, and therefore the quality of the molded article can be improved. Consequently, an injection molding machine 10 (FIG. 1) whereby molding quality can be improved can be provided.

In the present embodiment, heating of the molds by the high-frequency induction coil 80 was described using the example of the cavity faces 53, 63, but the cavity faces 52, 62, 54, 64 and the mating faces 51, 61, 55, and 65 are also heated simultaneously with the heating of the cavity faces 53, 63. Next, an injection molding method implemented using the injection molding machine 10 is described.

As depicted in FIG. 6, in Step 01 ("step" is hereinafter denoted as "ST"), the moveable mold is maintained in a state distanced by a predetermined dimension from the stationary mold. Specifically, as depicted in FIG. 5A, the movement of the moveable mold 60 comes to a stop in a state distanced by a predetermined dimension L1 from the stationary mold 50.

In ST02, the high-frequency induction coil, which is wound in a helical fashion in a substantially parallel direction with respect to the cavity face of the stationary mold and the cavity face of the moveable mold, is inserted in a substantially parallel direction between the cavity face of the stationary mold and the cavity face of the moveable mold. Specifically, as depicted in FIG. 4A, the high-frequency induction coil 80 faces the space between the stationary mold 50 and the moveable mold 60. The high-frequency induction coil 80 is moved by the robot arm 45 in a manner shown by arrow (2).

In ST03, an electrical current is caused to flow to the high-frequency induction coil by the high-frequency power supply, generating a magnetic field in the stationary mold and the moveable mold and generating eddy currents in the stationary mold and the moveable mold, whereupon the stationary mold and the moveable mold are heated by Joule heat obtained thereby.

Specifically, as depicted in FIG. 5B, when an electrical current is caused to flow to the third coil 83 of the high-frequency induction coil 80 by the high-frequency power supply as shown by arrows (3), a magnetic field is generated. Through generation of this magnetic field, lines of magnetic force are generated so as to substantially conform to the cavity faces 53, 63 as shown by arrows (4). The magnetic field strength is constant with respect to the position in the coil lengthwise direction as depicted in FIG. 5C. If the magnetic field strength is constant, eddy currents can be generated uniformly at the cavity faces 53, 63. Because the molds have electrical resistance, Joule heat is generated by the eddy currents and electrical resistance, and the cavity faces can be heated by this heat.

In ST04, when the stationary mold and the moveable mold temperatures have reached a predetermined temperature, the moveable mold is joined up with the stationary mold to effect die closure. Specifically, in FIG. 1, when the stationary mold 50 and the moveable mold 60 temperatures have reached a predetermined temperature, the die closure cylinder 19 is operated. Through the pushing operation of the die closure cylinder 19, the moveable mold 60 is joined up with the stationary mold 50 to implement die closure.

In ST05, a material in a molten state is injected into the cavity of the die-closed stationary mold and moveable mold. Specifically, in FIG. 1, once the moveable mold 60 has been closed onto the stationary mold 50, a material in a molten state is injected into the cavity from the material injection port of the stationary mold 50.

In ST06, in order to retrieve the molded article which has cooled to a solid in the cavity, the moveable mold is separated from the stationary mold. Specifically, in FIG. 1, the moveable mold 60 is distanced from the stationary mold 50. Because the resin molded article is left adhering to the cavity face of the moveable mold 60, the resin molded article is ejected with an ejector pin.

In FIG. 1, the injection molding method is implemented by an injection molding machine provided with heating means 70 composed of the high-frequency induction coil 80 and the high-frequency power supply 110, and provided with the stationary mold 50 and the moveable mold 60. Molded articles are obtained using the stationary mold 50 and the moveable mold 60 heated by the heating means 70.

In FIG. 6, the injection molding method is composed of a die-separation-state-maintaining step (ST01), a coil insertion step (ST02), a heating step (ST03), a die-closing step (ST04), a material-injection step (ST05), and a die-opening step (ST06).

In the coil insertion step, as depicted in FIG. 4A, the coils 81, 82, 83 of the high-frequency induction coil 80, which is wound in a helical fashion in a substantially parallel direction with respect to the cavity face 53 of the stationary mold 50 and the cavity face 63 of the moveable mold 60, is inserted in a substantially parallel direction between the cavity face 53 and the cavity face 63. In other words, the high-frequency induction coil 80 is disposed substantially parallel with respect to the cavity faces 53, 63.

As depicted in FIG. 5B, when an electrical current is caused to flow by the high-frequency power supply 110 (FIG. 2) to the third coil 83 of the high-frequency induction coil 80 as shown by arrows (3), a magnetic field is generated. Through generation of this magnetic field, lines of magnetic force are generated so as to substantially conform to the intermediate cavity face 53 of the stationary mold 50 and the intermediate cavity face 63 of the moveable mold 60, as shown by arrows (4). The magnetic field strength is constant with respect to position in the coil lengthwise direction, as depicted by FIG. 5C.

In FIG. 5B, the third coil 83 of the high-frequency induction coil 80 is disposed between the separated stationary mold 50 and moveable mold 60, in a substantially parallel direction with respect to the intermediate cavity face 53 of the stationary mold 50 and the intermediate cavity face 63 of the moveable mold 60, and is wound in a helical fashion in the substantially parallel direction. In other words, the third coil 83 of the high-frequency induction coil 80 is disposed substantially parallel to the cavity faces 53, 63.

An electrical current is caused to flow to the third coil 83 of the high-frequency induction coil 80 by the high-frequency power supply, and a magnetic field is generated. Through generation of the magnetic field, lines of magnetic force are generated so as to substantially conform to the cavity faces 53, 63, and therefore the magnetic field strength is constant with respect to position in the coil lengthwise direction. If the magnetic field strength is constant, eddy currents can be generated uniformly at the cavity faces 53, 63.

Because the molds have electrical resistance, Joule heat is generated by the eddy currents and electrical resistance, and the cavity faces can be heated by this heat. When a material in the molten state is injected into the heated mold cavity, flowability of the material is promoted, and therefore the quality of the molded article can be improved. Consequently, an injection molding method whereby molding quality can be improved can be provided.

As depicted in FIG. 2, the high-frequency induction coil 80 has five coils 81, 82, 83, 84, 85 disposed in an array. If, for example, a high-frequency induction coil is composed of a single coil, while an elongated cavity face of a small surface area can be heated, heating will take considerable time if the cavity face has a large surface area. In this regard, because the high-frequency induction coil 80 of the present invention has five coils 81, 82, 83, 84, 85 disposed in an array, a cavity face having a large surface area can be heated in a short time.

Second Embodiment

Figure 7:
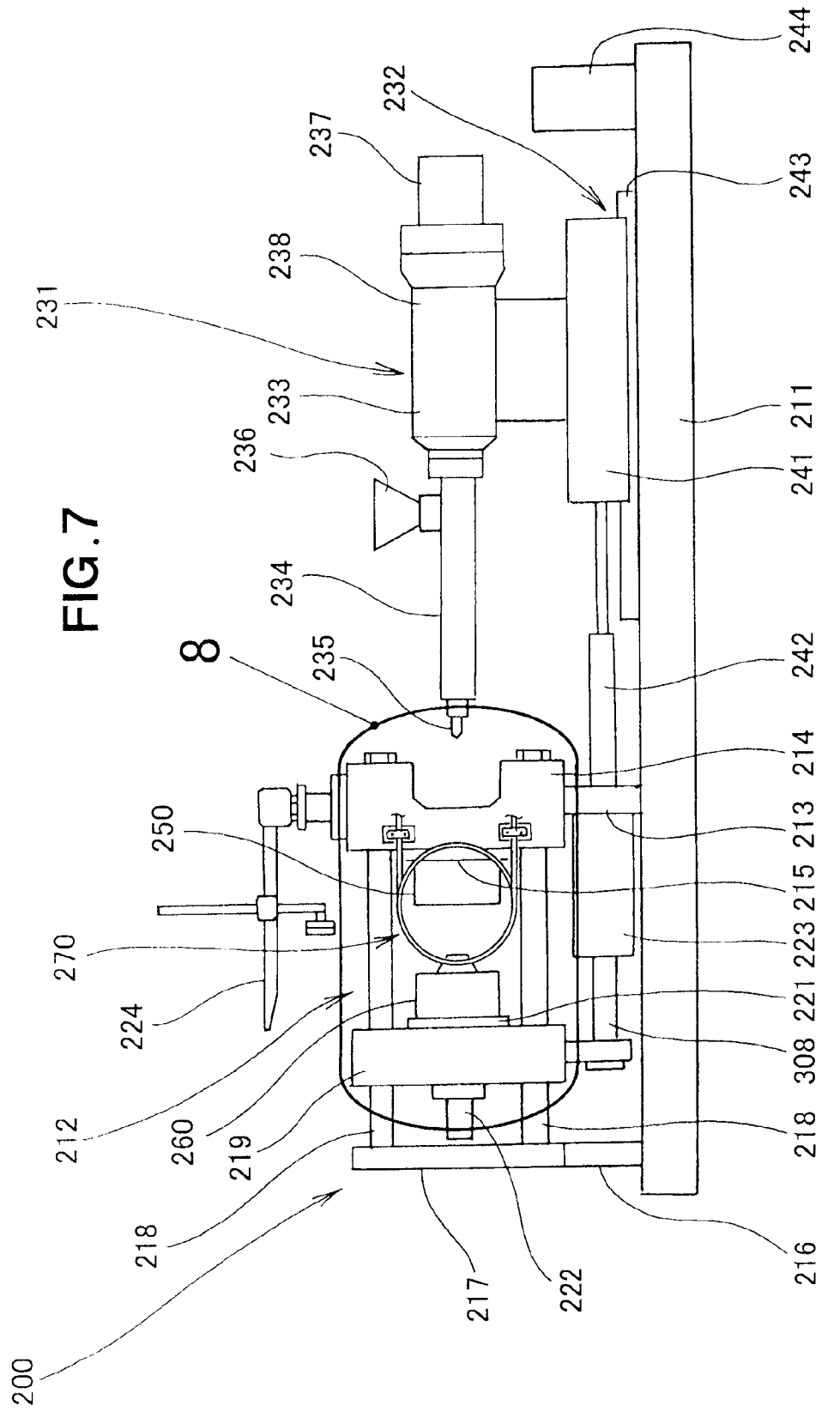
FIG. 7 is a front elevational view illustrating a molding apparatus according to a second embodiment of the present invention.

As depicted in FIG. 7, an injection molding machine 200 according to a second embodiment includes a die closure device 212 disposed in the front part of a bed 211, and an injection device 231 disposed in the rear part of the bed 211 so as to face toward this die closure device 212. A pair of molds provided to the die closure device 12 is composed of a stationary mold 250 and a moveable mold 260.

The die closure device 212 is provided with a stationary platen 214 attached to a center support stage 213 rising from the center part of the bed 211; the stationary mold 250 attached to the front end of this stationary platen 214 via a stationary-side attachment plate 215; a support member 217 attached to a front end support stage 216 rising from the front end of the bed 211; four tie bars 218 attached to the stationary platen 214 and to the support member 217; a moveable platen 219 attached in horizontal sliding fashion to the tie bars 218; the moveable mold 260 which is attached to the back end of this moveable platen 219 via a moveable-side attachment plate 221; an ejection cylinder 222 attached to the front end of the moveable platen 219, for thrusting out an ejection pin; and a die closure cylinder 223 linking the center support stage 213 and the moveable platen 219.

An automated retrieval robot 224 capable of movement in three-dimensional directions is attached to the upper end of the stationary platen 214. The automated retrieval robot 224 retrieves the resin molded article ejected from the moveable mold 260.

The injection device 231 is comprised of an injection cylinder 233 furnished on a slide mechanism 232 which is attached to the back part of the bed 211; a heated cylinder 234 attached to the front end of this injection cylinder 233 and having an internal screw; a nozzle 235 attached to the front end of this heated cylinder 234 and contacting a material injection port of the stationary mold 250; a hopper 236 attached onto the back end of the heated cylinder 234, the hopper adapted for accommodating a resin material supplied into the heated cylinder 234; a screw drive motor 237 attached to the back end of the injection cylinder 233, the screw drive motor adapted for causing the screw to rotate; a screw movement mechanism 238 disposed in the back part of the injection cylinder 233, the screw movement mechanism adapted for causing the screw to move in the horizontal direction; and an injection device movement cylinder 242 that links the center support stage 213 to a slider 241 of the slide mechanism 232.

Through a pulling operation of the injection device movement cylinder 242, the slider 241 moves along a rail 243 toward the die closure device 212 side, and therefore the nozzle 235 can be brought into contact with the material injection port of the stationary mold 250.

A control device 244 controls the respective operations of the ejection cylinder 222, the die closure cylinder 223, the automated retrieval robot 224, the screw drive motor 237, the screw movement mechanism 238, and the injection device movement cylinder 242.

Heating means 270 for heating the stationary mold 250 and the moveable mold 260 is furnished to the left side of the stationary platen 214 and the stationary mold 250.

Figure 8:
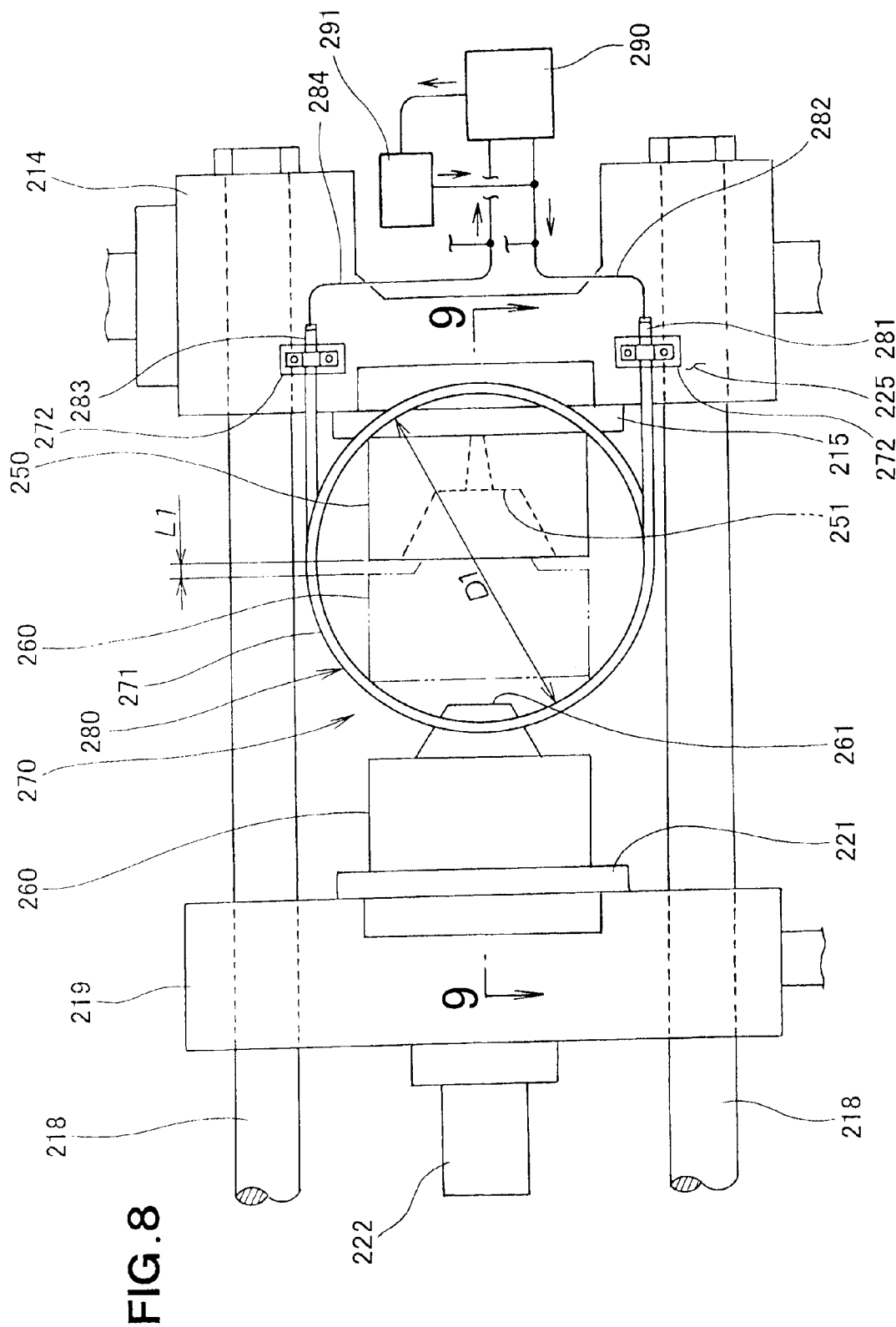
FIG. 8 is an enlarged view illustrating an area 8 of FIG. 7.

As depicted in FIG. 8, the heating means 270 is provided with a left high-frequency induction coil 280 attached via a left heat-insulator 72 to a left side face 225 of the stationary platen 214, and having a left ring section 271 wound a plurality of times in an annular configuration; and a high-frequency power supply 290 connected via a left lower-side pipeline 282 to a lower-side terminus 281 of this left high-frequency induction coil 280, and connected via a left upper-side pipeline 284 to an upper-side terminus 283 of the left high-frequency induction coil 280, to impart an electrical current to the left high-frequency induction coil 280. The high-frequency power supply 290 has a jacket construction, and is connected to the lower-side and upper-side pipelines 282, 284. A chiller unit 291 is connected to the left lower-side pipeline 281 and to the high-frequency power supply 290. The left high-frequency induction coil 280 is connected to the high-frequency power supply 290 by wiring, not illustrated. A water-cooled bus par can be cited as an analogous product to this high-frequency power supply 290. This water-cooled bus par is designed so that water passes through the inside of a pipe, and an electrical current flows through the wall of the pipe.

A coolant constantly flows inside the left high-frequency induction coil 280, and the left high-frequency induction coil 280 is cooled by this coolant. The coolant returned to the high-frequency power supply 290 from the left high-frequency induction coil 280 is at an elevated temperature, and is therefore cooled by a refrigerant inside the chiller unit 291, then again caused to flow to the inside of the left high-frequency induction coil 280. In other words, the coolant circulates through the left high-frequency induction coil 280, the high-frequency power supply 290, and the chiller unit 291.

Additionally, the left high-frequency induction coil 280 is formed such that the stationary mold 250, and the moveable mold 260 having moved to a position depicted by imaginary lines due to the pulling operation of the die-closure cylinder 223 (FIG. 7), fit inside an inside diameter D1. Where the dimension between the stationary mold 250 and the moveable mold 260 depicted by the imaginary lines is designated as L1, this dimension L1 depicts a predetermined dimension established prior to heating the stationary mold 250 and the moveable mold 260. A stationary-side cavity face 251 of concave shape is furnished to the stationary mold 250, and a moveable-side cavity face 261 of convex shape is furnished to the moveable mold 260.

In addition to the left high-frequency induction coil 280, the heating means 270 is provided with a right high-frequency induction coil formed with dimensions identical to the left high-frequency induction coil 280 and disposed coaxially therewith. The construction of the heating means 270 is next described in detail with reference to FIG. 9.

Figure 9:
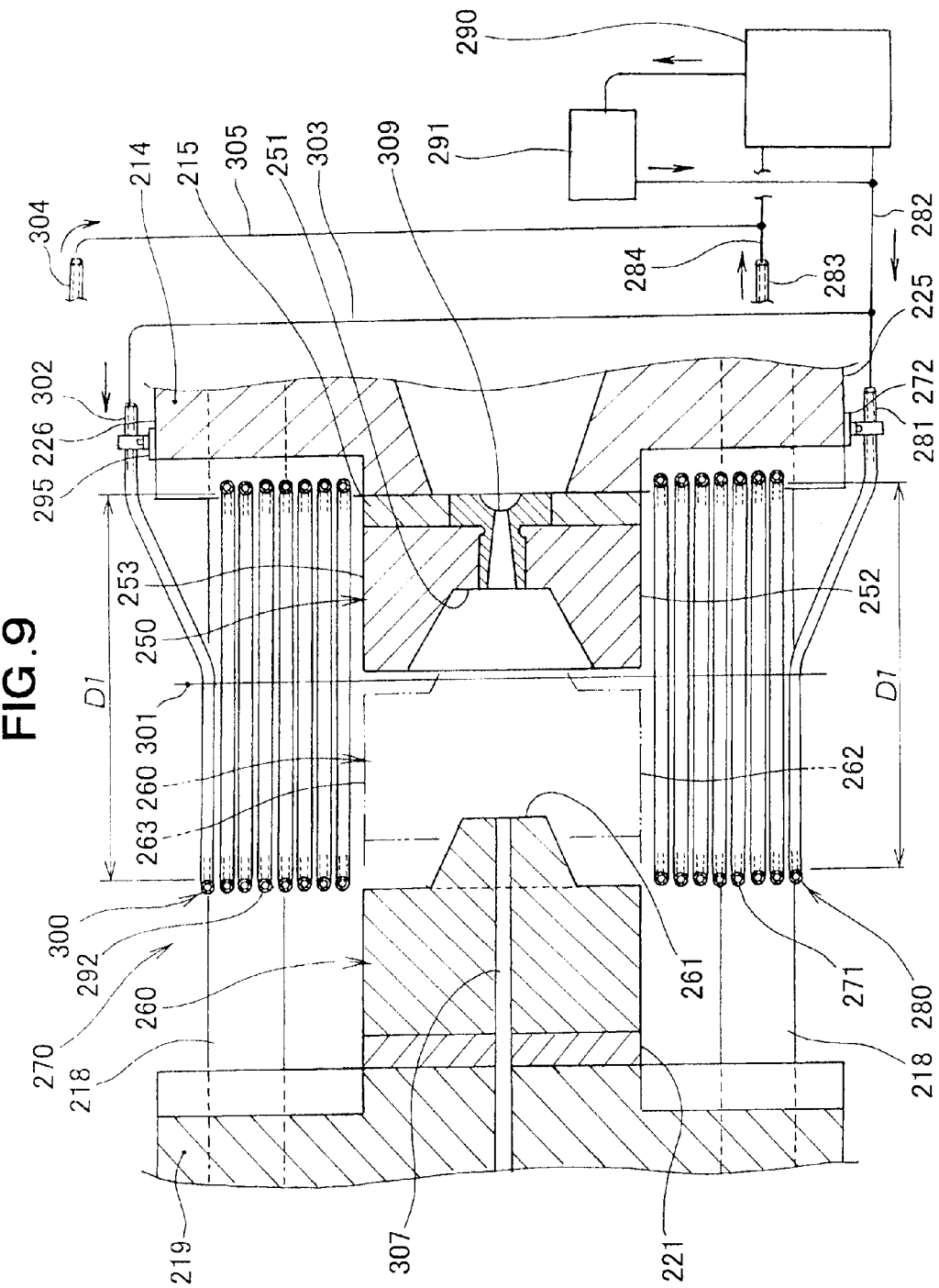
FIG. 9 is a sectional view taken along line 9-9 of FIG. 8.

As depicted in FIG. 9, the heating means 270 is comprised of the left high-frequency induction coil 280 that, with the stationary mold 250 and the moveable mold 260 depicted by the imaginary lines in a state distanced by the predetermined dimension L1 (FIG. 8), is furnished in proximity to a stationary mold left outside face 252 of the stationary mold 250 and a moveable mold left outside face 262 of the moveable mold 260, and has a left ring section 271 wound seven times in an annular configuration; a right high-frequency induction coil 300 furnished in proximity to a stationary mold right outside face 253 of the stationary mold 250 and a moveable mold right outside face 263 of the moveable mold 260, and having a right ring section 292 wound seven times in an annular configuration; and the high-frequency power supply 290 which is connected to the left high-frequency induction coil 280 and the right high-frequency induction coil 300, and which imparts an electrical current to the left high-frequency induction coil 280 and the right high-frequency induction coil 300. In other words, the heating means 270 is an induction heating device.

In the second embodiment, the number of times the left ring section 271 and the right ring section 292 are wound is seven, but the number may be determined as desired. A greater number of windings corresponds to a stronger magnetic force; therefore, preferably the number of windings is increased.

The stationary mold left outside face 252, the moveable mold left outside face 262, the stationary mold right outside face 253, and the moveable mold right outside face 263 are faces that respectively lie parallel to the opening/closing direction of the stationary mold 250 and the moveable mold 260. The right high-frequency induction coil 300 is attached via a right heat insulator 295 to a right side face 226 of the stationary platen 214.

The left high-frequency induction coil 280 and the right high-frequency induction coil 300 are a pair of high-frequency induction coils whose left ring section 271 and right ring section 292 face toward one another. The left high-frequency induction coil 280 and the right high-frequency induction coil 300 are formed so as to have the same inside diameter D1 and disposed on an identical axis 301.

The high-frequency power supply 290 is connected via a right lower-side pipeline 303 to a lower-side terminus 302 of the right high-frequency induction coil 300, and is connected via a right upper-side pipeline 305 to an upper-side terminus 304 of the right high-frequency induction coil 300. Coolant circulates through the right high-frequency induction coil 300, the high-frequency power supply 290, and the chiller unit 291, and coolant returned to the high-frequency power supply 290 is cooled by the chiller unit 291.

Next, the action of the injection molding machine 10 discussed above is described based on FIG. 10A to FIG. 10D.

Figure 10A:
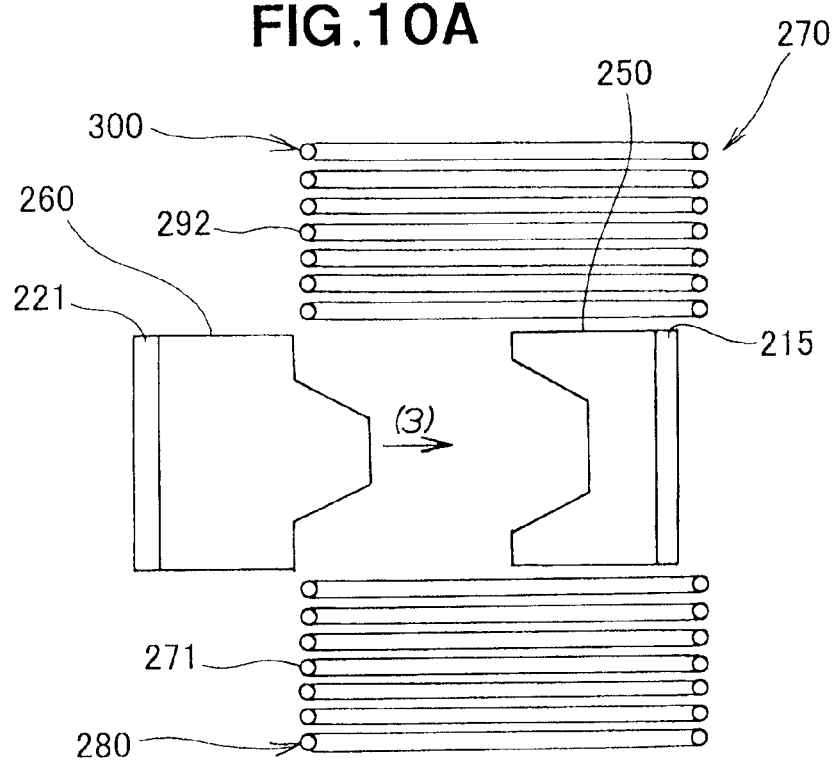

As depicted in FIG. 10A, the left ring section 271 of the left high-frequency induction coil 280 and the right ring section 292 of the right high-frequency induction coil 300 face toward one another, with the stationary mold 250 disposed between the left ring section 271 and the right ring section 292. The moveable mold 260 is moved toward the stationary mold 250 in the manner shown by arrow (3).

Figure 10B:
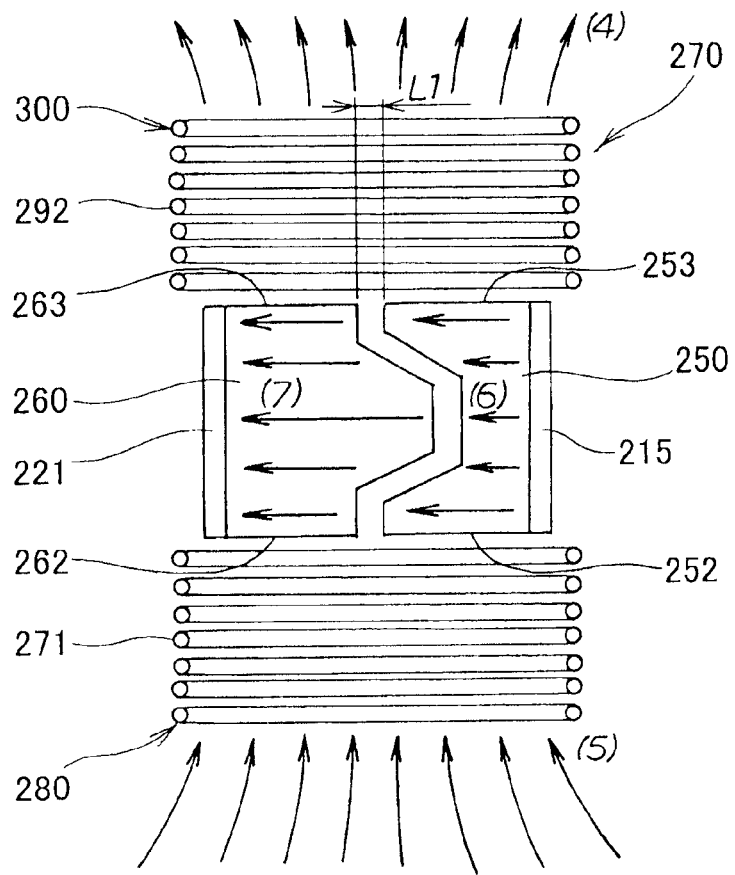
Figure 12:
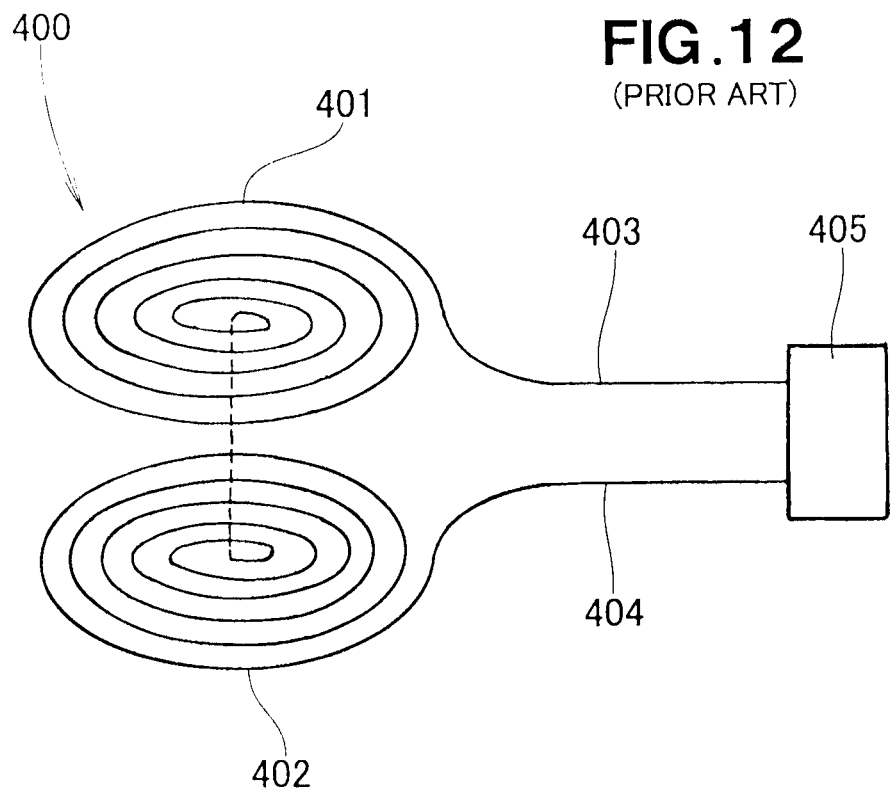
FIG. 12 is a view illustrating a basic arrangement of a first prior-art molding apparatus.
Figure 13:
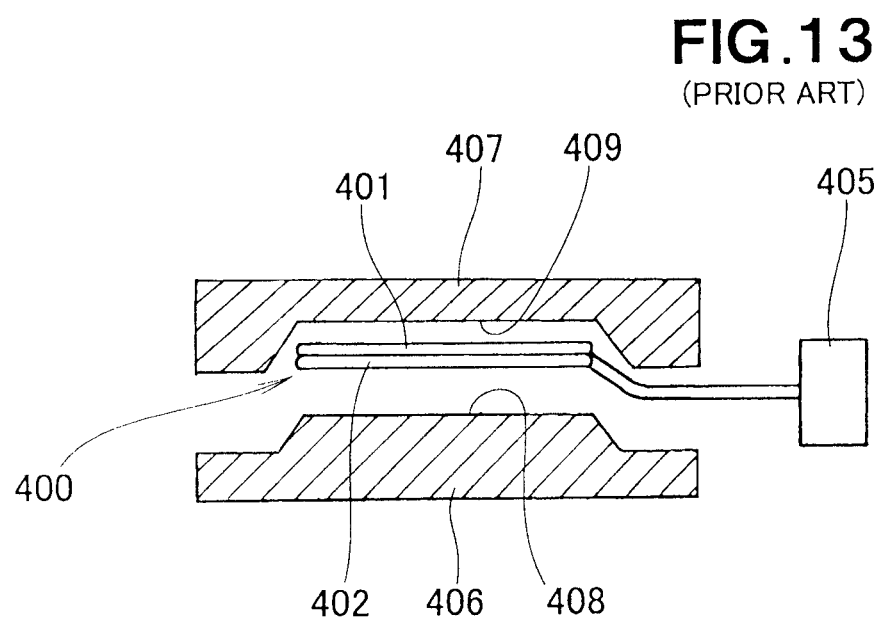
FIG. 13 is a view illustrating a method of use of a prior art high-frequency induction coil of FIG. 12.
Figure 14A:
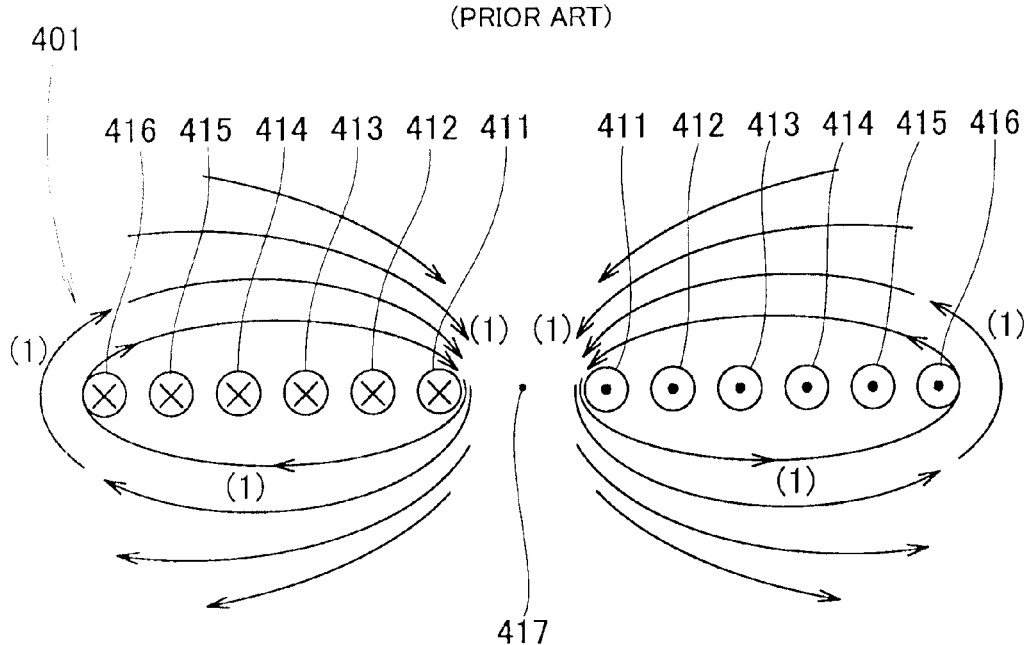
FIG. 14A and FIG. 14B are views illustrating an operation of the prior art high-frequency induction coil of FIG. 12.
Figure 14B:
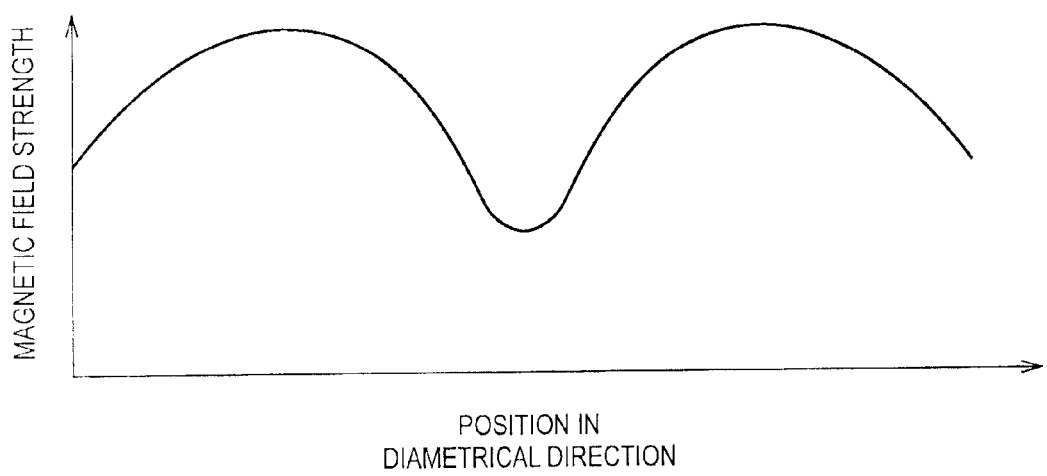
Figure 15:
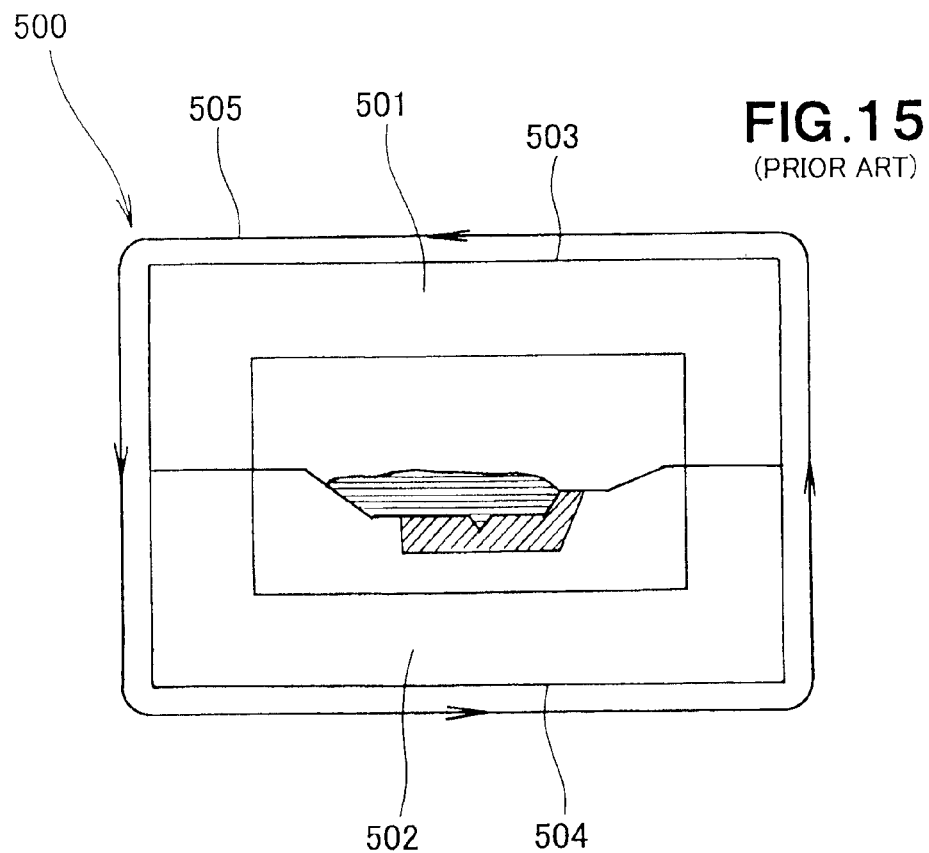
FIG. 15 is a view illustrating a basic arrangement of a second prior-art molding apparatus.
Figure 16:
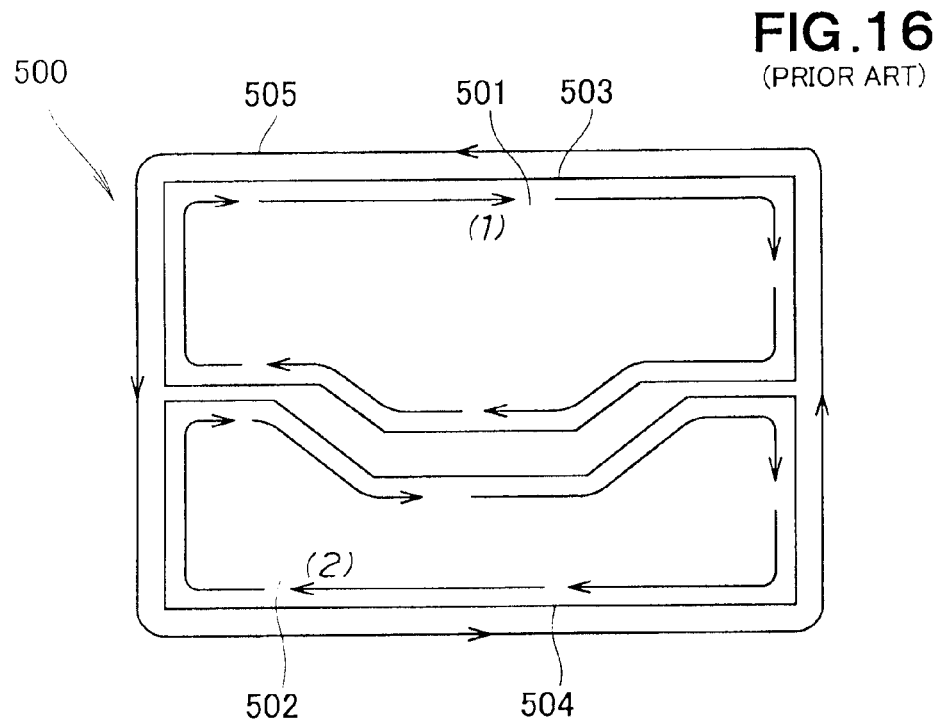
FIG. 16 is a view showing flow of lines of magnetic force in the molding apparatus of FIG. 15.

As depicted in FIG. 10B, movement of the moveable mold 260 comes to a stop in a state distanced by the predetermined dimension L1 from the stationary mold 50. An electrical current is caused to flow to the left high-frequency induction coil 280 and the right high-frequency induction coil 300 by the high-frequency power supply 290 (FIG. 9), and taken at a given moment, a magnetic field is generated as shown by arrows (4), (5). Through generation of this magnetic field, eddy currents are generated in the stationary mold 250 as shown by arrows (6), and eddy currents are generated in the moveable mold 260 as shown by arrows (7).

Because the stationary mold 250 and the moveable mold 260 have electrical resistance, Joule heat is generated by the eddy currents and electrical resistance, and the stationary mold 250 and the moveable mold 260 are heated by this heat. Heating of the stationary mold 250 and the moveable mold 260 is implemented immediately prior to die closure.

Next, the actions of molding a resin molded article and die opening are described.

As depicted in FIG. 10C, the moveable mold 260 is distanced from the stationary mold 250, leaving a resin molded article 306 adhering to the moveable-side cavity face 261 of the moveable mold 260. In other words, this is the mold opening state.

As depicted in FIG. 10D, because the left high-frequency induction coil 280 and the right high-frequency induction coil 300 are disposed to the left and right of the moveable mold 260, there are no obstacles above the moveable mold 260. Because of this, after the resin molded article 306 is ejected from the moveable mold 260 by an ejection pin 307 (FIG. 10C), the resin molded article 306 can be retrieved smoothly from above by the automated retrieval robot 224 (FIG. 8).

As depicted in FIG. 10B, with the moveable mold 260 in a state distanced by the predetermined dimension L1 from the stationary mold 250, the left high-frequency induction coil 280 is furnished in proximity to the moveable mold left outside face 262 of the moveable mold 260 and the stationary mold left outside face 252 of the stationary mold 250. With the moveable mold 260 in a state distanced by the predetermined dimension L1 from the stationary mold 250, the right high-frequency induction coil 300 is furnished in proximity to the moveable mold right outside face 263 of the moveable mold 260 and the stationary mold right outside face 253 of the stationary mold 250.

In other words, because the left high-frequency induction coil 280 and the right high-frequency induction coil 300 are disposed parallel to the opening/closing direction of the stationary mold 250 and the moveable mold 260, there is no concern that the moveable mold 260 will strike the high-frequency induction coils 280, 300 during die opening. Consequently, in the injection molding machine 200 (FIG. 8) in which the stationary mold 250 and the moveable mold 260 are heated by the heating means 270, a device enabling improved operability can be provided.

Next, an injection molding method implemented using the injection molding machine 10 is described.

As depicted in FIG. 11, in Step 01 ("step" is hereinafter denoted as "ST"), the moveable mold is maintained in a state distanced by a predetermined dimension from the stationary mold. Specifically, as depicted in FIG. 10B, movement of the moveable mold 260 comes to a stop in a state distanced by a predetermined dimension L1 from the stationary mold 250.

In ST02, the pair of high-frequency induction coils is brought into proximity to a first outside face of the stationary mold and a first outside face of the moveable mold, and to another outside face of the stationary mold and another outside face of the moveable mold, which faces are parallel to the moveable direction of the moveable mold. The pair of high-frequency induction coils is disposed so that the ring sections wound a plurality of times in an annular configuration face one another.

Specifically, as depicted in FIG. 10B, the left high-frequency induction coil 280 is brought into proximity to the moveable mold left outside face 262 of the moveable mold 260 and stationary mold left outside face 252 of the stationary mold 250. The right high-frequency induction coil 300 is brought into proximity to the moveable mold right outside face 263 of the moveable mold 260 and stationary mold right outside face 253 of the stationary mold 250. Further, the left high-frequency induction coil 280 and the right high-frequency induction coil 300 are disposed so that the left ring section 271 and the right ring section 292 wound seven times in an annular configuration face one another. As depicted in FIG. 9, the left high-frequency induction coil 280 and the right high-frequency induction coil 300 are formed so as to have the same inside diameter D1 and are disposed on an identical axis 301.

In ST03, an electrical current is caused to flow to the pair of high-frequency induction coils by the high-frequency power supply, generating a magnetic field in the stationary mold and the moveable mold and generating eddy currents in the stationary mold and the moveable mold, with the stationary mold and the moveable mold being heated by Joule heat obtained thereby.

Specifically, as depicted in FIG. 10B, when an electrical current is caused to flow to the left high-frequency induction coil 280 and the right high-frequency induction coil 300 by the high-frequency power supply, a magnetic field is generated as shown by arrows (4), (5). Through generation of this magnetic field, eddy currents are generated in the stationary mold 250 as shown by arrows (6), and eddy currents are generated in the moveable mold 260 as shown by arrows (7). Because the stationary mold 250 and the moveable mold 260 have electrical resistance, Joule heat is generated by the eddy currents and electrical resistance, and the stationary mold 250 and the moveable mold 260 are heated by this heat.

In ST04, when the stationary mold and the moveable mold temperatures have reached a predetermined temperature, the moveable mold is joined up with the stationary mold to effect die closure. Specifically, in FIG. 7, when the stationary mold 250 and the moveable mold 260 temperatures have reached a predetermined temperature, the die closure cylinder 223 is caused to carry out a pulling operation. A piston rod 308 of the die closure cylinder 223 advances, and therefore the moveable mold 260 is joined up with the stationary mold 250 to implement die closure.

In ST05, a material in a molten state is injected into the cavity of the die-closed stationary mold and moveable mold. Specifically, in FIG. 9, after the moveable mold 260 has closed onto the stationary mold 250, a material in a molten state is injected into the cavity from the material injection port 309 of the stationary mold 250.

In ST06, in order to retrieve the molded article which has cooled to a solid in the cavity, the moveable mold is separated from the stationary mold. Specifically, as depicted in FIG. 10C, the moveable mold 260 is distanced from the stationary mold 250. Because the resin molded article 306 is left adhering to the movable-side cavity face 261 of the moveable mold 260, the resin molded article 306 is ejected with the ejector pin 307.

In FIG. 9, the injection molding method is a method implemented by an injection molding machine provided with heating means 270 composed of the high-frequency power supply 290, the left high-frequency induction coil 280, and the right high-frequency induction coil 300, and provided with the stationary mold 250 and the moveable mold 260; and molded articles are obtained using the stationary mold 250 and the moveable mold 260 heated by the heating means 270.

In FIG. 11, the injection molding method is comprised of a die-separation-state-maintaining step (ST01), a coil-disposing step (ST02), a heating step (ST03), a die-closing step (ST04), a material-injection step (ST05), and a die-opening step (ST06).

In the coil-disposing step, as depicted in FIG. 10B, the left high-frequency induction coil 280 is brought into proximity with the moveable mold left outside face 262 and the stationary mold left outside face 252 which are parallel to the movable direction of the moveable mold 260. The right high-frequency induction coil 300 is brought into proximity with the moveable mold right outside face 263 and the stationary mold right outside face 253 which are parallel to the movable direction of the moveable mold 260. Further, the left high-frequency induction coil 280 and the right high-frequency induction coil 300 are disposed with the left ring section 271 and the right ring section 292 wound seven times in an annular configuration facing one another.

In other words, because the left high-frequency induction coil 280 and the right high-frequency induction coil 300 are disposed parallel to the opening/closing direction of the stationary mold 250 and the moveable mold 260, there is no concern that the moveable mold 260 will strike the high-frequency induction coils 280, 300 during die opening. Consequently, in a molding method whereby the stationary mold 250 and the moveable mold 260 are heated by the heating means 270, it is possible to provide a method enabling improved operability.

In the embodiment, an example of application of the molding apparatus according to the present invention to an injection molding machine was depicted; however, application to a die casting device is also possible. Further, whereas in the embodiment, an example of application of the molding method according to the present invention to an injection molding method was described, application to a die casting method is possible as well.

While the second embodiment depicted an example in which the pair of high-frequency induction coils is disposed to the left and right of the die closure device, the coils could be disposed above and below the die closure device instead.

While the second embodiment depicted an example in which the attachment position of the high-frequency induction coils is the side face of the stationary platen, the side face of the movable platen, or the bed, would also be acceptable. The high-frequency induction coils may be attached to the distal end of a robot arm furnished separately from the molding apparatus.

Further, whereas in the second embodiment the shape of the high-frequency induction coils according to the present invention is ring-shaped (FIG. 8), an elliptical shape or square shape would also be acceptable. However, it is essential for the stationary mold and the moveable mold to be accommodated in the inside of the ellipse or the inside of the square.

The molding technique of the present invention is suitable for heating of molds used in injection molding techniques.

Obviously, various minor changes and modifications of the present invention are possible in light of the above teaching. It is therefore to be understood that within the scope of the appended claims the invention may be practiced otherwise than as specifically described.

What is claimed is:

1. A molding method implemented using a molding apparatus which comprises heating means having a high-frequency induction coil and a high-frequency power supply, and a die comprised of a stationary mold and a moveable mold, the method comprising the steps of:

maintaining the moveable mold in a state separated from the stationary mold by a predetermined distance;

inserting the high-frequency induction coil, which is wound in a helical fashion with an axis extending in a direction substantially parallel with respect to a cavity face of the stationary mold and a cavity face of the moveable mold, in the substantially parallel direction between the cavity face of the stationary mold and the cavity face of the moveable mold;

heating the stationary mold and the moveable mold by Joule heat obtained by causing an electrical current to flow from the high-frequency power supply to the high-frequency induction coil to thereby generate a magnetic field and an eddy current in the stationary mold and the moveable mold, wherein, through generation of the magnetic field, lines of magnetic force are generated that substantially conform to the cavity faces of the molds, and a strength of the magnetic field is constant with respect to position in a lengthwise direction of the high-frequency induction coil;

closing the die by bringing together the moveable mold and the stationary mold when the stationary mold and the moveable mold are heated to a predetermined temperature;

injecting a molten-state material into a cavity of the closed stationary mold and moveable mold; and opening the die by separating the moveable mold from the stationary mold in order to retrieve a molded article having cooled to a solid in the cavity.

2. The molding method of claim 1, wherein the high-frequency induction coil comprises a plurality of coils disposed in an array.

3. A molding method implemented using a molding apparatus which comprises heating means having a pair of high-frequency induction coils and a high-frequency power supply, and a die comprised of a stationary mold and a moveable mold, the method comprising the steps of:

maintaining the moveable mold in a state separated a predetermined distanced from the stationary mold;

disposing the coils such that the pair of high-frequency induction coils are brought into proximity with a first outside face of the stationary mold and a first outside face of the moveable mold, and with another outside face of the stationary mold and another outside face of the moveable mold, which faces are parallel to the moveable direction of the moveable mold, and the pair of high-frequency induction coils are disposed so that ring sections wound a plurality of times in an annular configuration within the high-frequency induction coils face one another;

heating the stationary mold and the moveable mold by Joule heat obtained by causing an electrical current to flow from the high-frequency power supply to the pair of high-frequency induction coils to thereby generate a magnetic field and an Eddy current in the stationary mold and the moveable mold;

closing the die by bringing together the moveable mold and the stationary mold when the stationary mold and the moveable mold are heated to a predetermined temperature;

injecting a molten-state material into a cavity of the closed stationary mold and the moveable mold; and opening the die by separating the moveable mold from the stationary mold in order to retrieve the molded article cooled to a solid in the cavity.

* * * * *